(12) United States Patent
Wang et al.

(10) Patent No.: US 11,876,997 B2
(45) Date of Patent: Jan. 16, 2024

(54) ENCODER, DECODER AND CORRESPONDING METHODS OF MOST PROBABLE MODE LIST CONSTRUCTION FOR BLOCKS WITH MULTI-HYPOTHESIS PREDICTION

(71) Applicant: HUAWEI TECHNOLOGIES CO., LTD., Guangdong (CN)

(72) Inventors: Biao Wang, Shenzhen (CN); Semih Esenlik, Munich (DE); Jianle Chen, San Diego, CA (US); Anand Meher Kotra, Munich (DE); Han Gao, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/333,351

(22) Filed: May 28, 2021

(65) Prior Publication Data
US 2021/0289222 A1    Sep. 16, 2021

Related U.S. Application Data

(63) Continuation of application No. PCT/CN2019/122153, filed on Nov. 29, 2019.
(Continued)

(51) Int. Cl.
*H04N 19/50*    (2014.01)
*H04N 19/159*    (2014.01)
(Continued)

(52) U.S. Cl.
CPC ........... *H04N 19/50* (2014.11); *H04N 19/159* (2014.11); *H04N 19/176* (2014.11); *H04N 19/46* (2014.11); *H04N 19/70* (2014.11)

(58) Field of Classification Search
CPC ............................ H04N 19/50; H04N 19/159
See application file for complete search history.

(56) References Cited

U.S. PATENT DOCUMENTS

| 2011/0249731 A1 | 10/2011 | Zhao et al. |
| 2013/0176390 A1 | 7/2013 | Chen et al. |
(Continued)

FOREIGN PATENT DOCUMENTS

| CN | 1925619 A | 3/2007 |
| CN | 104584549 A | 4/2015 |
(Continued)

OTHER PUBLICATIONS

Document: JVET-L1001-v3, Benjamin Bross et al., Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 177 pages.
(Continued)

*Primary Examiner* — Jerry T Jean Baptiste
(74) *Attorney, Agent, or Firm* — WOMBLE BOND DICKINSON (US) LLP

(57) ABSTRACT

The present disclosure relates to the field of picture processing. Especially, the disclosure deals with improving the prediction of a block of a picture when decoding or encoding. A method of coding a block of a picture, comprising: obtaining an indication parameter for a current coding block. The indication parameter represents whether a multi-hypothesis prediction is applied to the current coding block. When the indication parameter represents that the multi-hypothesis prediction is applied to the current coding block, coding the current coding block according to a planar mode.

19 Claims, 8 Drawing Sheets

Related U.S. Application Data

(60) Provisional application No. 62/783,149, filed on Dec. 20, 2018, provisional application No. 62/773,149, filed on Nov. 29, 2018.

(51) Int. Cl.
  H04N 19/176 (2014.01)
  H04N 19/46 (2014.01)
  H04N 19/70 (2014.01)

(56) References Cited

U.S. PATENT DOCUMENTS

| | | | |
|---|---|---|---|
| 2014/0044179 | A1 | 2/2014 | Li et al. |
| 2020/0154107 | A1* | 5/2020 | Zhao ............... H04N 19/105 |
| 2021/0235072 | A1* | 7/2021 | Ko ................... H04N 19/70 |
| 2021/0392322 | A1* | 12/2021 | Chiang ............. H04N 19/51 |

FOREIGN PATENT DOCUMENTS

| | | |
|---|---|---|
| CN | 107750455 A | 3/2018 |
| CN | 107771393 A | 3/2018 |
| CN | 107925773 A | 4/2018 |
| CN | 108141604 A | 6/2018 |
| CN | 108702515 A | 10/2018 |
| WO | 2018149685 A1 | 8/2018 |

OTHER PUBLICATIONS

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Document: JVET-L1001-v9 , Benjamin Bross et al., Versatile Video Coding (Draft 3), Joint Video Experts Team (JVET) of ITU-T SG 16 WP 3 and ISO/IEC JTC 1/ SC 29/WG11, 12th Meeting: Macao, CN, Oct. 3-12, 2018, total 233 pages.

Document: JVET-L1030-v1, Chih-Wei Hsu et al., Description of Core Experiment 10: Combined and multi-hypothesis prediction, Joint Video Experts Team (JVET) ofITU-T SG 16 WP 3 and ISO/IECJTC 1/SC 29/WG11, 12th Meeting: Macao, CN, Oct. 3-12, 2018, total 10 pages.

Hsu, C. W. et al., "Description of Core Experiment 10 (CE10): Combined and multi-hypothesis prediction", 12. JVET Meeting; Oct. 3, 2018-Oct. 12, 2018; Macao; (The Joint Video Exploration Team of ISO/IEC JTC1/SC29/WG11 and ITU-T SG. 16), No. JVET-L1030 Nov. 3, 2018 (Mar. 11, 2018), Retrieved from the Internet: https://jvet-experts.org/ JVET-L1030-v2.zip JVET-L1030.v2.docx [retrieved on: Jul. 21, 2022].

Chiang, M. S. et al., "CE10.1.1: Multi-hypothesis prediction for improving AMVP mode, skip or merge mode, and intra mode ", 12. JVET Meeting; Oct. 3, 2018-Oct. 12, 2018; Macao; (The Joint Video Exploration Team of ISO/IEC JTC1/SC29/WG11 and ITU-T SG. 16), No. JVET-L0100 Oct. 12, 2018 (Dec. 10, 2018)Retrieved from the Internet: https://jvet-experts.org/ JVET-L0100-v5.zip JVET-L0100-v3-clean.docx [retrieved on: Jul. 21, 2022].

Man-Shu Chiang, et al., CE10.1: Combined and multi-hypothesis predication, Joint Video Experts Team (JVET) of ITU-T SG 16 WP 3 and ISO/IEC JTC 1/SC 29/WG 11, JVET-K0257-v1, 11th Meeting: Ljubljana, S1, pp. 1-6.

Weiwei Xu, Haitao Yang, Yin Zhao, and Jianle Chen, CE10-related: inter prediction sample filtering, Joint Video Experts Team (JVET) of ITU-T SG 16 WP 3 and ISO-IEC JTC 1/SC 29/WG 11, JVET-L0375-v1, JVET-L0375-v1, Oct. 2018, pp. 1-4.

Weiwei Xu, Biao Wang, Haitao Yang, and Jianle Chen, CE19: Simplification on Combined Inter-Intra Prediction (test 10.1.3), Joint Video Experts Team (JVET) of ITU-T SG 16 WP 3 and ISO/IEC JTC 1/SC 29/WG 11, JVET-0290, 13th Meeting: Marrakech, MA, Jan. 2019, pp. 1-4.

Chih-Wei Hsu et al: Description of Core Experiment 10: Combined and multi-hypothesis prediction , Joint Video Experts Team (JVET) 12th Meeting: Macao, CN, 3 Oct. 12, 2018, Document: JVET-L1030-v3.

\* cited by examiner

US 11,876,997 B2

ENCODER, DECODER AND CORRESPONDING METHODS OF MOST PROBABLE MODE LIST CONSTRUCTION FOR BLOCKS WITH MULTI-HYPOTHESIS PREDICTION

CROSS-REFERENCE TO RELATED APPLICATIONS

This application is a continuation of international application PCT/CN2019/122153, filed on Nov. 29, 2019, which claims the benefit of U.S. Provisional Application No. 62/773,149, filed on Nov. 29, 2018 and U.S. Provisional Application No. 62/783,149, filed on Dec. 20, 2018, All of the aforementioned patent applications are hereby incorporated by reference in their entireties.

TECHNICAL FIELD

Embodiments of the present disclosure generally relate to the field of picture processing and more particularly to construct a most probable mode list.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Some embodiments of the disclosure provide an improved method and apparatus allowing to reduce the complexity of decoding and, thus, increase the video decoding efficiency.

The foregoing and other benefits are achieved by the subject matter of the independent claims. Further implementation forms are apparent from the dependent claims, the description and the figures.

According to an embodiment, the disclosure relates to a method of decoding a block of a picture (or a frame) implemented by a decoding device, comprising: obtaining an indication parameter for a current coding block according to a bitstream, the indication parameter represents whether a multi-hypothesis prediction is applied to the current coding block or not;
 obtaining an index parameter for the current coding block according to the bitstream;
 when, according to a value of indication parameter, the multi-hypothesis prediction is applied to the current coding block, obtaining an intra prediction mode for the current coding block according to the index parameter and a predefined list, wherein the predefined list comprises the following intra prediction modes orderly: planar mode, DC mode, Vertical mode, Horizontal mode; decoding the current coding block according to the intra prediction mode for the current coding block.

According to an embodiment, the disclosure relates to a method of decoding a block of a picture (or a frame) implemented by a decoding device, comprising obtaining an indication parameter for a current coding block according to a bitstream, the indication parameter represents whether a multi-hypothesis prediction is applied to the current coding block or not;
 obtaining an index parameter for the current coding block according to the bitstream;
 when, according to a value of indication parameter, the multi-hypothesis prediction is applied to the current coding block, obtaining an intra prediction mode for the current coding block according to the index parameter and a predefined list, wherein the predefined list comprises the following intra prediction modes orderly: planar mode, DC mode, Vertical mode; decoding the current coding block according to the intra prediction mode for the current coding block.

According to an embodiment, the disclosure relates to a method of decoding a block of a picture (or a frame) implemented by a decoding device, comprising obtaining an indication parameter for a current coding block according to a bitstream, the indication parameter represents whether a multi-hypothesis prediction is applied to the current coding block or not;
 obtaining an index parameter for the current coding block according to the bitstream;
 when, according to a value of indication parameter, the multi-hypothesis prediction is applied to the current coding block,
 obtaining an intra prediction mode for the current coding block according to the index parameter and a predefined list, wherein the predefined list comprises the following intra prediction modes orderly: planar mode, DC mode;
 decoding the current coding block according to the intra prediction mode for the current coding block.

According to an embodiment, the disclosure relates to a method of decoding a block of a picture (or a frame) implemented by a decoding device, comprising:
 obtaining an indication parameter for a current coding block according to a bitstream, the indication parameter represents whether a multi-hypothesis prediction is applied to the current coding block or not;
 when, according to a value of indication parameter, the multi-hypothesis prediction is applied to the current coding block,
 decoding the current coding block according to a Planar mode.

According to an embodiment, the disclosure relates to a method of decoding a block of a picture (or a frame) implemented by a decoding device, comprising:

obtaining an indication parameter for a current coding block according to a bitstream, the indication parameter represents whether a multi-hypothesis prediction is applied to the current coding block or not;

obtaining an index parameter for the current coding block according to the bitstream; when, according to a value of indication parameter, the multi-hypothesis prediction is applied to the current coding block, obtaining an intra prediction mode for the current coding block according to the index parameter and a predefined list, wherein the predefined list comprises the following intra prediction modes orderly: DC mode, planar mode, Vertical mode, Horizontal mode;

decoding the current coding block according to the intra prediction mode for the current coding block.

According to an embodiment, the disclosure relates to a method of decoding a block of a picture (or a frame) implemented by a decoding device, comprising:

obtaining an indication parameter for a current coding block according to a bitstream, the indication parameter represents whether a multi-hypothesis prediction is applied to the current coding block or not;

obtaining an index parameter for the current coding block according to the bitstream; when, according to a value of indication parameter, the multi-hypothesis prediction is applied to the current coding block, obtaining an intra prediction mode for the current coding block according to the index parameter and a predefined list, wherein the predefined list comprises the following intra prediction modes orderly: DC mode, planar mode, Vertical mode;

decoding the current coding block according to the intra prediction mode for the current coding block.

According to an embodiment, the disclosure relates to a method of decoding a block of a picture (or a frame) implemented by a decoding device, comprising:

obtaining an indication parameter for a current coding block according to a bitstream, the indication parameter represents whether a multi-hypothesis prediction is applied to the current coding block or not;

obtaining an index parameter for the current coding block according to the bitstream; when, according to a value of indication parameter, the multi-hypothesis prediction is applied to the current coding block, obtaining an intra prediction mode for the current coding block according to the index parameter and a predefined list, wherein the predefined list comprises the following intra prediction modes orderly: DC mode, planar mode;

decoding the current coding block according to the intra prediction mode for the current coding block.

According to an embodiment, the disclosure relates to a method of decoding a block of a picture (or a frame) implemented by a decoding device, comprising:

obtaining an indication parameter for a current coding block according to a bitstream, the indication parameter represents whether a multi-hypothesis prediction is applied to the current coding block or not;

when, according to a value of indication parameter, the multi-hypothesis prediction is applied to the current coding block, decoding the current coding block according to a DC mode.

According to an embodiment, the disclosure relates to a method of constructing a most probable mode (MPM) list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

when the left block of the current coding block is available, and a value corresponding to an intra prediction mode of the left block is in a first predefined range (in an example, the range could be from 2 to 34, which include 2 and 34), adding a horizontal mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

when the left block of the current coding block is available, and a value corresponding to an intra prediction mode of the left block is in a first predefined range (in an example, the range could be from 35 to 66, which include 35 and 66), adding a vertical mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, and a value corresponding to an intra prediction mode of the left block is in a first predefined range (in an example, the range could be from 2 to 34, which include 2 and 34), adding a horizontal mode into a MPM list;

when the above block of the current coding block is available, and a value corresponding to an intra prediction mode of the above block is in the first predefined range (in an example, the range could be from 2 to 34, which include 2 and 34), adding another horizontal mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, and a value corresponding to an intra prediction mode of the left block is in a first predefined range (in an example, the range could be from 2 to 34, which include 2 and 34), adding a horizontal mode into a MPM list;

when the above block of the current coding block is available, and a value corresponding to an intra prediction mode of the above block is in the first predefined range (in an example, the range could be from 2 to 34, which include 2 and 34), adding a Planar mode, a DC mode and a vertical into the MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, and a value corresponding to an intra prediction mode of the left block is in a first predefined range (in an example, the range could be from 2 to 34, which include 2 and 34), adding a horizontal mode into a MPM list;

when the above block of the current coding block is available, and a value corresponding to an intra prediction mode of the above block is in a second predefined range (in an example, the range could be from 35 to 66, which include 35 and 66), adding a vertical mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, and a value corresponding to an intra prediction mode of the left block is in a second predefined range (in an example, the range could be from 35 to 66, which include 35 and 66), adding a vertical mode into a MPM list;

when the above block of the current coding block is available, and a value corresponding to an intra prediction mode of the above block is in the second predefined range (in an example, the range could be from 35 to 66, which include 35 and 66), adding a Planar mode, a DC mode and a horizontal mode into the MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, and a value corresponding to an intra prediction mode of the left block is in a second predefined range (in an example, the range could be from 35 to 66, which include 35 and 66), adding a vertical mode into a MPM list;

when the above block of the current coding block is available, and a value corresponding to an intra prediction mode of the above block is in a first predefined range (in an example, the range could be from 2 to 34, which include 2 and 34), adding a horizontal mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is not available, and the above block of the current coding block is not available, adding a Planar mode, a DC mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is not available, the above block of the current coding block is available and an intra prediction mode of the above block is Planar mode, adding a Planar mode, a DC mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is not available, the above block of the current coding block is available and an intra prediction mode of the above block is DC mode, adding a DC mode, a Planar mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is not available, the above block of the current coding block is available and a value corresponding to an intra prediction mode of the above block is in a second predefined range (in an example, the range could be from 35 to 66, which include 35 and 66), adding a vertical mode, a DC mode, a Planar mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is not available, the above block of the current coding block is available and a value corresponding to an intra prediction mode of the above block is in a first predefined range (in an example, the range could be from 2 to 34, which include 2 and 34), adding a horizontal mode, a DC mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, an intra prediction mode of the left block is Planar mode and the above block of the current coding block is not available, adding a Planar mode, a DC mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, an intra prediction mode of the left block is Planar mode, the above block of the current coding block is available and an intra prediction mode of the above block is Planar mode, adding a Planar mode, a DC mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);
  determining whether an above block (for example, block A in FIG. 6) of a current coding block is available or not (for example, if there is no intra prediction mode of the above block, the above block is not available, if there is an intra prediction mode of the above block, the above block is available);
  when the left block of the current coding block is available, an intra prediction mode of the left block is Planar mode, the above block of the current coding block is available and an intra prediction mode of the above block is DC mode,
  adding a Planar mode, a DC mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);
  determining whether an above block (for example, block A in FIG. 6) of a current coding block is available or not (for example, if there is no intra prediction mode of the above block, the above block is not available, if there is an intra prediction mode of the above block, the above block is available);
  when the left block of the current coding block is available, an intra prediction mode of the left block is Planar mode, the above block of the current coding block is available and a value corresponding to an intra prediction mode of the above block is in a second predefined range (in an example, the range could be from 35 to 66, which include 35 and 66), adding a Planar mode, a vertical mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);
  determining whether an above block (for example, block A in FIG. 6) of a current coding block is available or not (for example, if there is no intra prediction mode of the above block, the above block is not available, if there is an intra prediction mode of the above block, the above block is available);
  when the left block of the current coding block is available, an intra prediction mode of the left block is Planar mode, the above block of the current coding block is available and a value corresponding to an intra prediction mode of the above block is in a first predefined range (in an example, the range could be from 2 to 34, which include 2 and 34),
  adding a Planar mode, a horizontal mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);
  determining whether an above block (for example, block A in FIG. 6) of a current coding block is available or not (for example, if there is no intra prediction mode of the above block, the above block is not available, if there is an intra prediction mode of the above block, the above block is available);
  when the left block of the current coding block is available, an intra prediction mode of the left block is DC mode and the above block of the current coding block is not available, adding a DC mode, a Planar mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);
  determining whether an above block (for example, block A in FIG. 6) of a current coding block is available or not (for example, if there is no intra prediction mode of the above block, the above block is not available, if there is an intra prediction mode of the above block, the above block is available);
  when the left block of the current coding block is available, an intra prediction mode of the left block is DC mode, the above block of the current coding block is available and an intra prediction mode of the above block is Planar mode,
  adding a DC mode, a Planar mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);
  determining whether an above block (for example, block A in FIG. 6) of a current coding block is available or not (for example, if there is no intra prediction mode of the above block, the above block is not available, if there is an intra prediction mode of the above block, the above block is available);
  when the left block of the current coding block is available, an intra prediction mode of the left block is DC mode, the above block of the current coding block is available and an intra prediction mode of the above block is DC mode,
  adding a DC mode, a Planar mode into a MPM list.

According to an embodiment, the disclosure relates to a method of constructing a most probable mode, MPM, list for intra prediction, the method comprising:
- determining whether a left block (for example, block L in FIG. 6) of a current coding block is available or not (for example, if there is no intra prediction mode of the left block, the left block is not available, if there is an intra prediction mode of the left block, the left block is available);
- determining whether an above block (for example, block A in FIG. 6) of a current coding block is available or not (for example, if there is no intra prediction mode of the above block, the above block is not available, if there is an intra prediction mode of the above block, the above block is available);
- when the left block of the current coding block is available, an intra prediction mode of the left block is DC mode, the above block of the current coding block is available and a value corresponding to an intra prediction mode of the above block is in a second predefined range (in an example, the range could be from 35 to 66, which include 35 and 66), adding a DC mode, a vertical mode into a MPM list.

According to an embodiment, the disclosure relates to a method of constructing a most probable mode, MPM, list for intra prediction, the method comprising:
- determining whether a left block (for example, block L in FIG. 6) of a current coding block is available or not (for example, if there is no intra prediction mode of the left block, the left block is not available, if there is an intra prediction mode of the left block, the left block is available);
- determining whether an above block (for example, block A in FIG. 6) of a current coding block is available or not (for example, if there is no intra prediction mode of the above block, the above block is not available, if there is an intra prediction mode of the above block, the above block is available);
- when the left block of the current coding block is available, an intra prediction mode of the left block is DC mode, the above block of the current coding block is available and a value corresponding to an intra prediction mode of the above block is in a first predefined range (in an example, the range could be from 2 to 34, which include 2 and 34), adding a DC mode, a horizontal mode into a MPM list.

According to an embodiment, the disclosure relates to a method of constructing a most probable mode, MPM, list for intra prediction, the method comprising:
- determining whether a left block (for example, block L in FIG. 6) of a current coding block is available or not (for example, if there is no intra prediction mode of the left block, the left block is not available, if there is an intra prediction mode of the left block, the left block is available);
- determining whether an above block (for example, block A in FIG. 6) of a current coding block is available or not (for example, if there is no intra prediction mode of the above block, the above block is not available, if there is an intra prediction mode of the above block, the above block is available);
- when the left block of the current coding block is available, a value corresponding to an intra prediction mode of the left block is in a second predefined range (in an example, the range could be from 35 to 66, which include 35 and 66), and the above block of the current coding block is not available, adding an vertical mode, a Planar mode into a MPM list.

According to an embodiment, the disclosure relates to a method of constructing a most probable mode, MPM, list for intra prediction, the method comprising:
- determining whether a left block (for example, block L in FIG. 6) of a current coding block is available or not (for example, if there is no intra prediction mode of the left block, the left block is not available, if there is an intra prediction mode of the left block, the left block is available);
- determining whether an above block (for example, block A in FIG. 6) of a current coding block is available or not (for example, if there is no intra prediction mode of the above block, the above block is not available, if there is an intra prediction mode of the above block, the above block is available);
- when the left block of the current coding block is available, a value corresponding to an intra prediction mode of the left block is in a second predefined range (in an example, the range could be from 35 to 66, which include 35 and 66), the above block of the current coding block is available and an intra prediction mode of the above block is Planar mode, adding an vertical mode, a Planar mode into a MPM list.

According to an embodiment, the disclosure relates to a method of constructing a most probable mode, MPM, list for intra prediction, the method comprising:
- determining whether a left block (for example, block L in FIG. 6) of a current coding block is available or not (for example, if there is no intra prediction mode of the left block, the left block is not available, if there is an intra prediction mode of the left block, the left block is available);
- determining whether an above block (for example, block A in FIG. 6) of a current coding block is available or not (for example, if there is no intra prediction mode of the above block, the above block is not available, if there is an intra prediction mode of the above block, the above block is available);
- when the left block of the current coding block is available, a value corresponding to an intra prediction mode of the left block is in a second predefined range (in an example, the range could be from 35 to 66, which include 35 and 66), the above block of the current coding block is available and an intra prediction mode of the above block is DC mode, adding an vertical mode, a DC mode into the MPM list.

According to an embodiment, the disclosure relates to a method of constructing a most probable mode, MPM, list for intra prediction, the method comprising:
- determining whether a left block (for example, block L in FIG. 6) of a current coding block is available or not (for example, if there is no intra prediction mode of the left block, the left block is not available, if there is an intra prediction mode of the left block, the left block is available);
- determining whether an above block (for example, block A in FIG. 6) of a current coding block is available or not (for example, if there is no intra prediction mode of the above block, the above block is not available, if there is an intra prediction mode of the above block, the above block is available);
- when the left block of the current coding block is available, a value corresponding to an intra prediction mode of the left block is in a first predefined range (in an example, the range could be from 2 to 34, which include 2 and 34), and the above block of the current coding block is not available, adding a horizontal mode, a Planar mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, a value corresponding to an intra prediction mode of the left block is in a first predefined range (in an example, the range could be from 2 to 34, which include 2 and 34), the above block of the current coding block is available and an intra prediction mode the above block is Planar mode, adding a horizontal mode, a Planar mode into a MPM list.

According to an embodiment, the disclosure relates to a method of constructing a most probable mode, MPM, list for intra prediction, the method comprising:

determining whether a left block (for example, block L in FIG. 6) of a current coding block is available or not (for example, if there is no intra prediction mode of the left block, the left block is not available, if there is an intra prediction mode of the left block, the left block is available);

determining whether an above block (for example, block A in FIG. 6) of a current coding block is available or not (for example, if there is no intra prediction mode of the above block, the above block is not available, if there is an intra prediction mode of the above block, the above block is available);

when the left block of the current coding block is available, a value corresponding to an intra prediction mode of the left block is in a first predefined range (in an example, the range could be from 2 to 34, which include 2 and 34), the above block of the current coding block is available and an intra prediction mode the above block is DC mode, adding a horizontal mode, a DC mode into a MPM list.

According to an embodiment, the disclosure relates to a method of processing a block according to most probable mode, MPM, list, the method comprising:

constructing a first MPM list for a current block according to intra modes of neighboring blocks of the current block (in one example, the MPM list of the current block comprises six intra modes. In an example, one MPM list comprises one or more intra modes means that the MPM list comprises one or more values corresponding to one or more intra modes, one value corresponding to one intra mode);

constructing a second MPM list of the current block according to one or more intra modes of the first MPM list of the current block;

obtaining an indication parameter for the current block according to a bitstream, the indication parameter represents whether a multi-hypothesis prediction is applied to the current block or not;

using, according to a value of indication parameter, the first MPM list or the second MPM list to process the current block (for example, the MPM list could be used in the intra prediction of the current block).

In an embodiment, the method further comprises: the constructing a second MPM list of the current block according to one or more intra modes of the first MPM list of the current block comprises:

when the second MPM list of the current block comprises one intra mode, constructing the second MPM list of the current block according to the first intra mode in the first MPM list of the current block.

In an embodiment, the method further comprises the constructing a second MPM list of the current block according to one or more intra modes of the first MPM list of the current block comprises:

when the second MPM list of the current block comprises two intra modes, constructing the second MPM list of the current block according to the first intra mode and the second intra mode in the first MPM list of the current block.

In a possible implementation form of the method according to any preceding implementation of the first aspect or the thirty-seventh aspect as such, the method further comprises the constructing a second MPM list of the current block according to one or more intra modes of the first MPM list of the current block comprises:

when the second MPM list of the current block comprises three intra modes, constructing the second MPM list of the current block according to the first intra mode, the second intra mode and the third intra mode in the first MPM list of the current block.

In an embodiment, the method further comprises the constructing a second MPM list of the current block according to one or more intra modes of the first MPM list of the current block comprises:

when the second MPM list of the current block comprises four intra modes, constructing the second MPM list of the current block according to the first intra mode, the second intra mode, the third intra mode and the fourth intra mode in the first MPM list of the current block.

In an embodiment, the method further comprises when the first intra mode in the first MPM list of the current block is Planar mode, a Planar mode is added into the second MPM list (in an example, Planar mode is the first intra mode in the MPM list of the current block).

In an embodiment, the method further comprises when the first intra mode in the first MPM list of the current block is DC mode, a DC mode is added into the second MPM list (in an example, DC mode is the first intra mode in the second MPM list of the current block).

In an embodiment, the method further comprises when a value corresponding to the first intra prediction mode in the first MPM list of the current block is in a first predefined range (in an example, the range could be from 2 to 34, which include 2 and 34), a horizontal mode is added into the second MPM list of the current block (in an example, horizontal mode is the first intra mode in the second MPM list of the current block).

In an embodiment, the method further comprises a value corresponding to the first intra prediction mode in the first MPM list of the current block is in a second predefined range (in an example, the range could be from 35 to 66, which include 35 and 66), vertical mode is added into the second MPM list of the current block (in an example, vertical mode is the first intra mode in the second MPM list of the current block).

According to an embodiment, the disclosure relates to a method of constructing a most probable mode, MPM, list for intra prediction, the method comprising:

obtaining an indication parameter for a current block according to a bitstream, the indication parameter represents whether a multi-hypothesis prediction is applied to the current coding block or not;

when, according to a value of indication parameter, the multi-hypothesis prediction is applied to the current coding block, determining whether a left block (for example, block L in FIG. 6) of the current coding block is available or not (for example, if there is no intra prediction mode of the left block, the left block is not available, if there is an intra prediction mode of the left block, the left block is available), when the left block of the current coding block is not available, adding a Planar mode into a MPM list of the current coding block (in an example, before this adding operation, the MPM list of the current coding block may be an empty list).

In an embodiment, the method further comprises:

when the left block of the current coding block is available and an intra mode of the left block is Planar mode, adding a Planar mode into a MPM list of the current coding block (in an example, before this adding operation, the MPM list of the current coding block may be an empty list).

In an embodiment, the method further comprises:

when the left block of the current coding block is available and an intra mode of the left block is DC mode, adding a DC mode into a MPM list of the current coding block (in an example, before this adding operation, the MPM list of the current coding block may be an empty list).

In an embodiment, the method further comprises:

when the left block of the current coding block is available and a value corresponding to an intra mode of the left block is in a first predefined range (in an example, the range could be from 2 to 34, which include 2 and 34), adding a horizontal mode into a MPM list of the current coding block (in an example, before this adding operation, the MPM list of the current coding block may be an empty list).

In an embodiment, the method further comprises:

when the left block of the current coding block is available and a value corresponding to an intra mode of the left block is in a second predefined range (in an example, the range could be from 35 to 66, which include 35 and 66), adding a vertical mode into a MPM list of the current coding block (in an example, before this adding operation, the MPM list of the current coding block may be an empty list).

In an embodiment, the method further comprises:

determining whether an above block (for example, block A in FIG. 6) of the current coding block is available or not (for example, if there is no intra prediction mode of the above block, the above block is not available, if there is an intra prediction mode of the above block, the above block is available), when the above block of the current coding block is not available, adding a Planar mode into a MPM list of the current coding block (in an example, before this adding operation, the MPM list of the current coding block comprises one intra mode. After this adding process, the MPM list comprises two intra modes, for example, the MPM list may comprises (0, 0) or (1, 0) or (50, 0) or (18, 0)).

In an embodiment, the method further comprises:

determining whether an above block (for example, block A in FIG. 6) of the current coding block is available or not (for example, if there is no intra prediction mode of the above block, the above block is not available, if there is an intra prediction mode of the above block, the above block is available), when the above block of the current coding block is not available and a Planar mode is not comprised in the MPM list of the current coding block (in an example, when an intra mode of the left block is DC mode or angular mode, a Planar mode is not comprised in the MPM list after the first intra mode is added into the MPM list), adding a Planar mode into a MPM list of the current coding block (in an example, before this adding operation, the MPM list of the current coding block comprises one intra mode. After this adding process, the MPM list comprises two intra modes, for example, the MPM list may comprises (1, 0) or (50, 0) or (18, 0)).

In an embodiment, the method further comprises:

when the above block of the current coding block is available and an intra mode of the above block is Planar mode, adding a Planar mode into a MPM list of the current coding block (in an example, before this adding operation, the MPM list of the current coding block comprises one intra mode. After this adding process, the MPM list comprises two intra modes, for example, the MPM list may comprises (0, 0) or (1, 0) or (50, 0) or (18, 0)).

In an embodiment, the method further comprises:

when the above block of the current coding block is available, an intra mode of the above block is Planar mode and a Planar mode is not comprised in the MPM list of the current coding block (in an example, when an intra mode of the left block is DC mode or angular mode, a Planar mode is not comprised in the MPM list after the first intra mode is added into the MPM list), adding a Planar mode into a MPM list of the current coding block (in an example, before this adding operation, the MPM list of the current coding block comprises one intra mode. After this adding process, the MPM list comprises two intra modes, for example, the MPM list may comprises (1, 0) or (50, 0) or (18, 0)).

In an embodiment, the method further comprises:

when the above block of the current coding block is available and an intra mode of the above block is DC mode, adding a DC mode into a MPM list of the current coding block (in an example, before this adding operation, the MPM list of the current coding block comprises one intra mode. After this adding process, the MPM list comprises two intra modes, for example, the MPM list may comprises (0, 1) or (1, 1) or (50, 1) or (18, 1)).

In an embodiment, the method further comprises:

when the above block of the current coding block is available, an intra mode of the above block is DC mode and a DC mode is not comprised in the MPM list of the current coding block (in an example, when an intra mode of the left block is not a DC mode, a DC mode is not comprised in the MPM list after the first intra mode is added into the MPM list), adding a DC mode into a MPM list of the current coding block (in an example, before this adding operation, the MPM list of the current coding block comprises one intra mode.

After this adding process, the MPM list comprises two intra modes, for example, the MPM list may comprises (0, 1) or (50, 1) or (18, 1)).

In an embodiment, the method further comprises:
when the above block of the current coding block is available and a value corresponding to an intra mode of the above block is in a first predefined range (in an example, the range could be from 2 to 34, which include 2 and 34), adding a horizontal mode into a MPM list of the current coding block (in an example, before this adding operation, the MPM list of the current coding block comprises one intra mode. After this adding process, the MPM list comprises two intra modes, for example, the MPM list may comprises (0, 18) or (1, 18) or (50, 18) or (18, 18)).

In an embodiment, the method further comprises:
when the above block of the current coding block is available, a value corresponding to an intra mode of the above block is in a first predefined range (in an example, the range could be from 2 to 34, which include 2 and 34), and a horizontal mode is not comprised in the MPM list of the current coding block (in an example, when an intra mode of the left block is DC mode or Planar mode or a value corresponding to the intra mode of the left block is not in the first predefined range, a horizontal mode is not comprised in the MPM list after the first intra mode is added into the MPM list), adding a horizontal mode into a MPM list of the current coding block (in an example, before this adding operation, the MPM list of the current coding block comprises one intra mode. After this adding process, the MPM list comprises two intra modes, for example, the MPM list may comprises (0, 18) or (1, 18) or (50, 18)).

In an embodiment, the method further comprises:
when the above block of the current coding block is available and a value corresponding to an intra mode of the above block is in a second predefined range (in an example, the range could be from 35 to 66, which include 35 and 66), adding a vertical mode into a MPM list of the current coding block (in an example, before this adding operation, the MPM list of the current coding block comprises one intra mode. After this adding process, the MPM list comprises two intra modes, for example, the MPM list may comprises (0, 50) or (1, 50) or (50, 50) or (18, 50)).

In an embodiment, the method further comprises:
when the above block of the current coding block is available, a value corresponding to an intra mode of the above block is in a second predefined range (in an example, the range could be from 35 to 66, which include 35 and 66) and a vertical mode is not comprised in the MPM list of the current coding block (in an example, when an intra mode of the left block is DC mode or Planar mode or a value corresponding to the intra mode of the left block is not in the second predefined range, a vertical mode is not comprised in the MPM list after the first intra mode is added into the MPM list), adding a vertical mode into a MPM list of the current coding block (in an example, before this adding operation, the MPM list of the current coding block comprises one intra mode. After this adding process, the MPM list comprises two intra modes, for example, the MPM list may comprises (0, 50) or (1, 50) or (18, 50)).

In an embodiment, the method further comprises:
when a quantity of one or more intra modes in the MPM list of the current coding block is less than a predefined value (for example, the value may be 2, 3, or 4), and a Planar mode is not comprised in the MPM list of the current coding block, adding a Planar mode into the MPM list of the current coding block.

In an embodiment, the method further comprises:
when a quantity of one or more intra modes in the MPM list of the current coding block is less than a predefined value (for example, the value may be 2, 3, or 4), and a DC mode is not comprised in the MPM list of the current coding block, adding a DC mode into the MPM list of the current coding block.

In an embodiment, the method further comprises:
when a quantity of one or more intra modes in the MPM list of the current coding block is less than a predefined value (for example, the value may be 2, 3, or 4), and a vertical mode is not comprised in the MPM list of the current coding block, adding a vertical mode into the MPM list of the current coding block.

In a an embodiment, the method further comprises:
when a quantity of one or more intra modes in the MPM list of the current coding block is less than a predefined value (for example, the value may be 2, 3, or 4), and a horizontal mode is not comprised in the MPM list of the current coding block, adding a horizontal mode into the MPM list of the current coding block.

According to an embodiment, the disclosure relates to a method of decoding a block of a picture (or a frame) implemented by a decoding device, comprising:
constructing a most probable mode, MPM, list for a current block according to intra modes of neighboring blocks of the current block (in one example, the MPM list of the current block comprises six intra modes. In an example, one MPM list comprises one or more intra modes means that the MPM list comprises one or more values corresponding to one or more intra modes, one value corresponding to one intra mode), wherein the MPM list comprises one or more angular modes;
obtaining an indication parameter for the current block according to a bitstream, the indication parameter represents whether a multi-hypothesis prediction is applied to the current block or not;
obtaining an index parameter for the current block according to the bitstream; when, according to a value of indication parameter, the multi-hypothesis prediction is applied to the current block,
obtaining an intra prediction mode for the current block according to the index parameter and the MPM list of the current block;
when a value corresponding to the intra prediction mode of the current block is in a predefined range (in an example, the range could be from 2 to 34, which include 2 and 34; or the range could be from 35 to 66, which include 35 and 66), decoding the current block according to a predefined mode (for example, the predefined mode may be horizontal mode or vertical mode).

In an embodiment, the method further comprises when a value corresponding to the intra prediction mode of the current block is in a range 2 to 34 (which include 2 and 34), the predefined mode is horizontal mode, or when a value corresponding to the intra prediction mode of the current block is in a range 2 to 33 (which include 2 and 33), the predefined mode is horizontal mode.

In an embodiment, the method further comprises when a value corresponding to the intra prediction mode of the current block is in a range 35 to 66 (which include 35 and 66), the predefined mode is vertical mode, or when a value corresponding to the intra prediction mode of the current block is in a range 34 to 66 (which include 34 and 66), the predefined mode is vertical mode.

In an embodiment, the method further comprises when the intra prediction mode of the current block is an angular mode (for example, a value corresponding to the intra prediction mode of the current block is in a range 2 to 66, which include 2 and 66), the predefined mode is Planar mode.

In an embodiment, the method further comprises when the intra prediction mode of the current block is an angular mode (for example, a value corresponding to the intra prediction mode of the current block is in a range 2 to 66, which include 2 and 66), the predefined mode is DC mode.

In an embodiment, the method further comprises when a value corresponding to the intra prediction mode of the current block is in a range 2 to 66 (which include 2 and 66), the predefined mode is vertical mode.

In an embodiment, the method further comprises when a value corresponding to the intra prediction mode of the current block is in a range 2 to 66 (which include 2 and 66), the predefined mode is horizontal mode.

In an embodiment, the method further comprises when the intra prediction mode for the current block is Planar mode, decoding the current block according to a Planar mode.

In an embodiment, the method further comprises when the intra prediction mode for the current block is DC mode, decoding the current block according to a DC mode.

In an embodiment, the method further comprises when the intra prediction mode for the current block is DC mode, decoding the current block according to a Planar mode.

In an embodiment, the method further comprises the index parameter has a maximum value of N, where N is smaller than the size of the MPM list, N is positive integer.

In an embodiment, the method further comprises N is equal to 1 (the index parameter can have a value of either a 0 or 1).

In an embodiment, the method further comprises N is equal to 3 (the index parameter can have a value of either a 0, 1, 2 or 3).

In an embodiment, the method further comprises the index parameter is predefined and equal to 0, which indicates the first candidate in the MPM list.

According to an embodiment, the disclosure relates to a method of decoding a block of a picture (or a frame) implemented by a decoding device, comprising:
  obtaining an indication parameter for a current coding block according to a bitstream, the indication parameter represents whether a multi-hypothesis prediction is applied to the current coding block or not;
  obtaining an index parameter for the current coding block according to the bitstream;
  when, according to a value of indication parameter, the multi-hypothesis prediction is applied to the current coding block, obtaining an intra prediction mode for the current coding block according to the index parameter and a predefined list, wherein the predefined list comprises the following intra prediction modes orderly: planar mode, Horizontal mode, and Vertical mode; and
  decoding the current coding block according to the intra prediction mode for the current coding block.

According to an embodiment, the disclosure relates to a method of decoding a block of a picture (or a frame) implemented by a decoding device, comprising:
  obtaining an indication parameter for a current coding block according to a bitstream, the indication parameter represents whether a multi-hypothesis prediction is applied to the current coding block or not;
  obtaining an index parameter for the current coding block according to the bitstream;
  when, according to a value of indication parameter, the multi-hypothesis prediction is applied to the current coding block, obtaining an intra prediction mode for the current coding block according to the index parameter and a predefined list, wherein the predefined list comprises the following intra prediction modes orderly: planar mode, Vertical mode, and Horizontal mode; and
  decoding the current coding block according to the intra prediction mode for the current coding block.

According to an embodiment, the disclosure relates to a method of decoding a block of a picture, comprising:
  obtaining an indication parameter for a current coding block, wherein the indication parameter represents whether a multi-hypothesis prediction is applied to the current coding block;
  when the indication parameter represents that the multi-hypothesis prediction is applied to the current coding block; decoding the current coding block according to a planar mode.

In an embodiment, the multi-hypothesis prediction is a combined inter and intra prediction (CIIP).

In an embodiment, the indication parameter is CIIP flag.

In an embodiment, the indication parameter is carried by merge data syntax.

In an embodiment, the method further comprises: obtaining the planar mode for the current coding block according to a most probable mode (MPM) list, wherein each of the intra prediction mode in the MPM list is indexed with a corresponding value of MPM list index.

In an embodiment, the method further comprises:
  parsing a bitstream to obtain a MPM list index, wherein the MPM list index has value between 0 to N−1, and wherein N is the entries of the intra prediction modes in the MPM list; and obtaining the intra prediction mode for the current coding block from the MPM list according to the value of the MPM list index.

In a an embodiment, the MPM list comprises at least planar mode.

In an embodiment, the MPM list comprises planar mode and at least one of DC mode, vertical mode and horizontal mode.

In an embodiment, the MPM list consist of planar mode.

In an embodiment, the MPM list is constructed from a pre-defined default list.

In an embodiment, the MPM list index is coded into decimal or binary representation.

In an embodiment, a decoder comprising a processing circuitry for carrying out the method according to any preceding implementation of the forty-third aspect.

In an embodiment, a decoder, comprising: a memory storage comprising instructions; and
  one or more processors in communication with the memory, wherein the one or more processors execute the instructions to carry out the method according to any preceding implementation of the forty-third aspect.

According to an embodiment, the disclosure relates to an apparatus for decoding, the apparatus comprising: a determining unit configured to obtain an indication parameter for a current coding block, wherein the indication parameter represents whether a multi-hypothesis prediction is applied to the current coding block; and an intra prediction processing unit configured to perform intra prediction for the current coding block based on a planar mode when the indication parameter represents that the multi-hypothesis prediction is applied to the current coding block.

In an embodiment, wherein the apparatus further comprises a parsing unit, configured to parse a plurality of syntax elements from a bitstream of a video signal; the determining unit further configured to determine the planar mode based on a syntax element from the plurality of syntax elements.

According to an embodiment, the disclosure relates to a method of encoding a block of a picture, comprising: obtaining an indication parameter for a current block, wherein the indication parameter represents whether a multi-hypothesis prediction is applied to the current block; when the indication parameter represents that the multi-hypothesis prediction is applied to the current block, encoding the current block according to a planar mode.

In an embodiment, the multi-hypothesis prediction is a combined inter and intra prediction (CIIP).

In an embodiment, the indication parameter is CIIP flag.

In an embodiment, the indication parameter is carried by merge data syntax.

In an embodiment, the method further comprises:
obtaining the planar mode for the current coding block according to a most probable mode (MPM) list, wherein each of the intra prediction mode in the MPM list is indexed with a corresponding value of MPM list index.

In an embodiment, the method further comprises: indexing each of the intra prediction mode in the MPM list with a corresponding value of MPM list index; parsing the MPM list index from a bitstream, wherein the MPM list index has value between 0 to N−1, wherein N is the entries of the intra prediction modes in the MPM list. Obtaining the intra prediction mode of the current coding block from the MPM list according to the value of the MPM list index.

In an embodiment, the MPM list comprises at least planar mode.

In an embodiment, the MPM list comprises planar mode and at least one of DC mode, vertical mode and horizontal mode.

In an embodiment, the MPM list consist of planar mode.

In an embodiment, the MPM list is constructed from a pre-defined default list.

In an embodiment, the MPM list index is coded into decimal or binary representation.

In an embodiment, an encoder comprising a processing circuitry for carrying out the method according to any preceding implementation of the forty-fifth aspect.

In an embodiment, an encoder comprising a memory storage comprising instructions; and
one or more processors in communication with the memory, wherein the one or more processors execute the instructions to carry out the method according to any preceding implementation of the forty-fifth aspect.

In an embodiment, a computer program product comprising program code for performing the method of any preceding implementation of the forty-fifth aspect when executed on a computer or a processor.

According to an embodiment, the disclosure relates to an apparatus for encoding a block of a picture, the apparatus comprising: a determining unit configured to obtain an indication parameter for a current block, wherein the indication parameter represents whether a multi-hypothesis prediction is applied to the current block; and an intra prediction processing unit configured to encode the current block according to a planar mode when the indication parameter represents that the multi-hypothesis prediction is applied to the current block.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
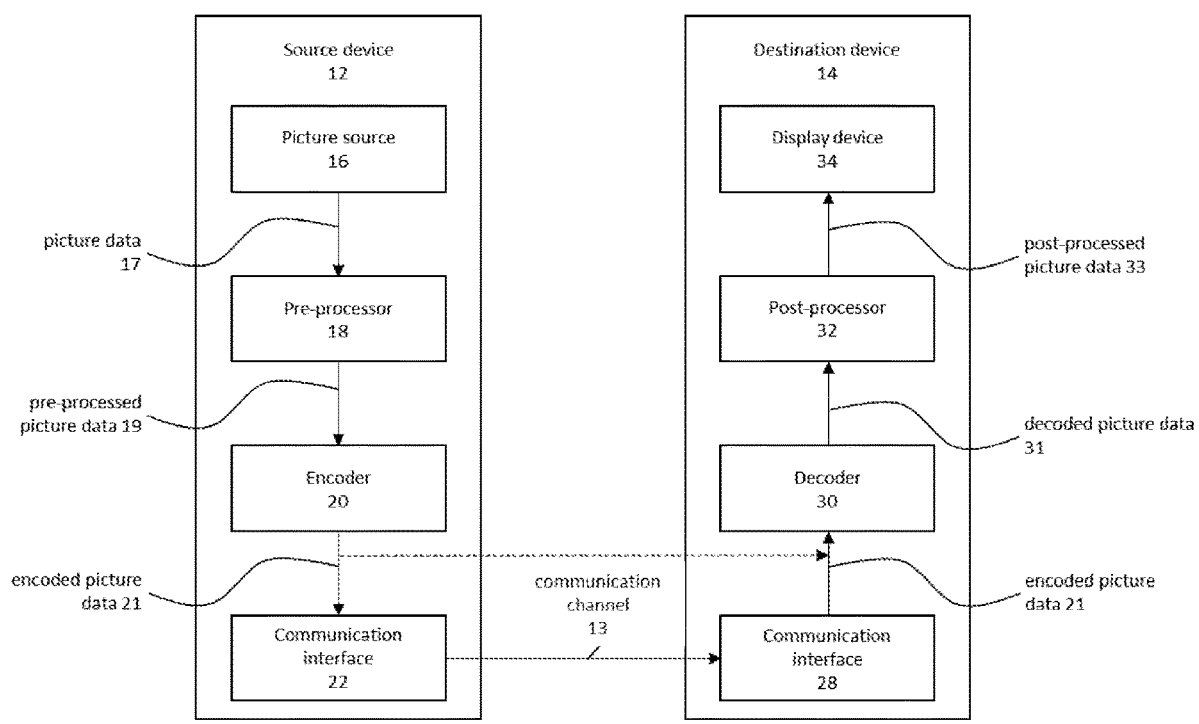
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g., functional units, to perform the described one or plurality of method operations (e.g., one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g., functional units, a corresponding method may include one operation to perform the functionality of the one or plurality of units (e.g., one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, e.g., the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, e.g., the quality of the reconstructed video pictures is lower or worse compared to the quality of the original video pictures.

Several video coding standards belong to the group of "lossy hybrid video codecs" (e.g., combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, e.g., encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, e.g., coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g., a video coding system 10 (or short coding system 10) that may utilize techniques of this present disclosure. Video encoder 20 (or short encoder 20) and video decoder 30 (or short decoder 30) of video coding system 10 represent examples of devices that may be configured to perform techniques in accordance with various examples described in the present disclosure.

As shown in FIG. 1A, the coding system 10 comprises a source device 12 configured to provide encoded picture data 21 e.g., to a destination device 14 for decoding the encoded picture data 13.

The source device 12 comprises an encoder 20, and may additionally comprise a picture source 16, a pre-processor (or pre-processing unit) 18, e.g., a picture pre-processor 18, and a communication interface or communication unit 22 in an embodiment.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally comprise a communication interface or communication unit 28, a post-processor 32 (or post-processing unit 32) and a display device 34 in an embodiment.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
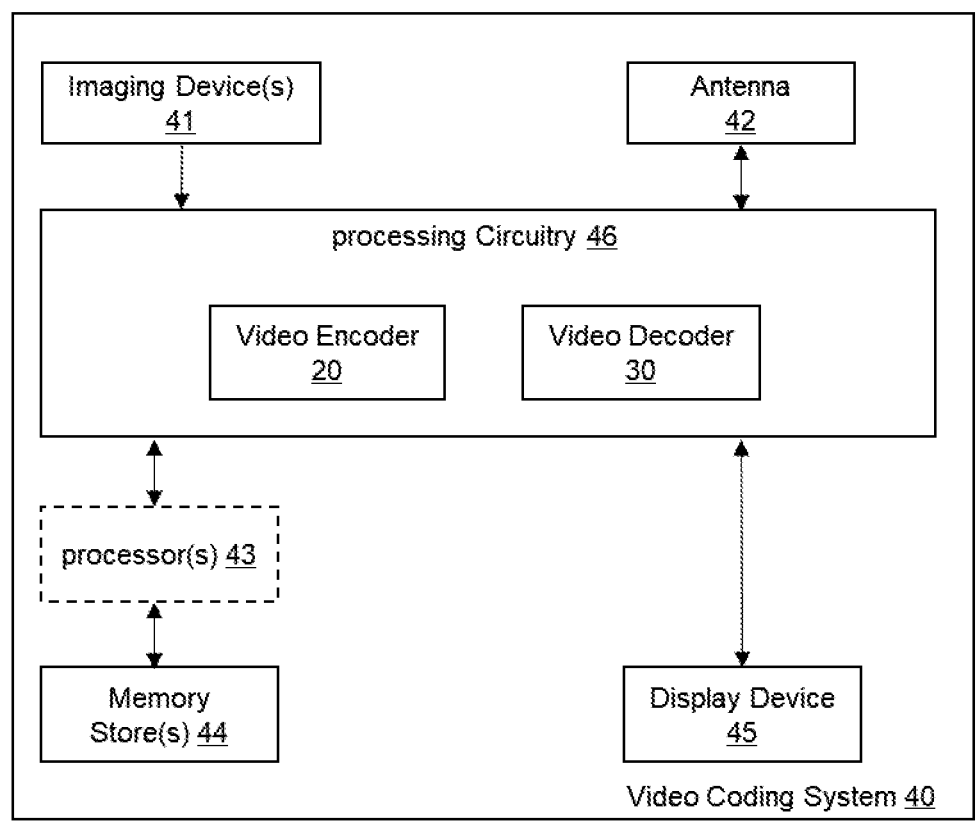
FIG. 1B is a block diagram showing another example of a video coding system configured to implement embodiments of the disclosure.

The encoder 20 (e.g., a video encoder 20) or the decoder 30 (e.g., a video decoder or both encoder 20 and decoder 30) may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
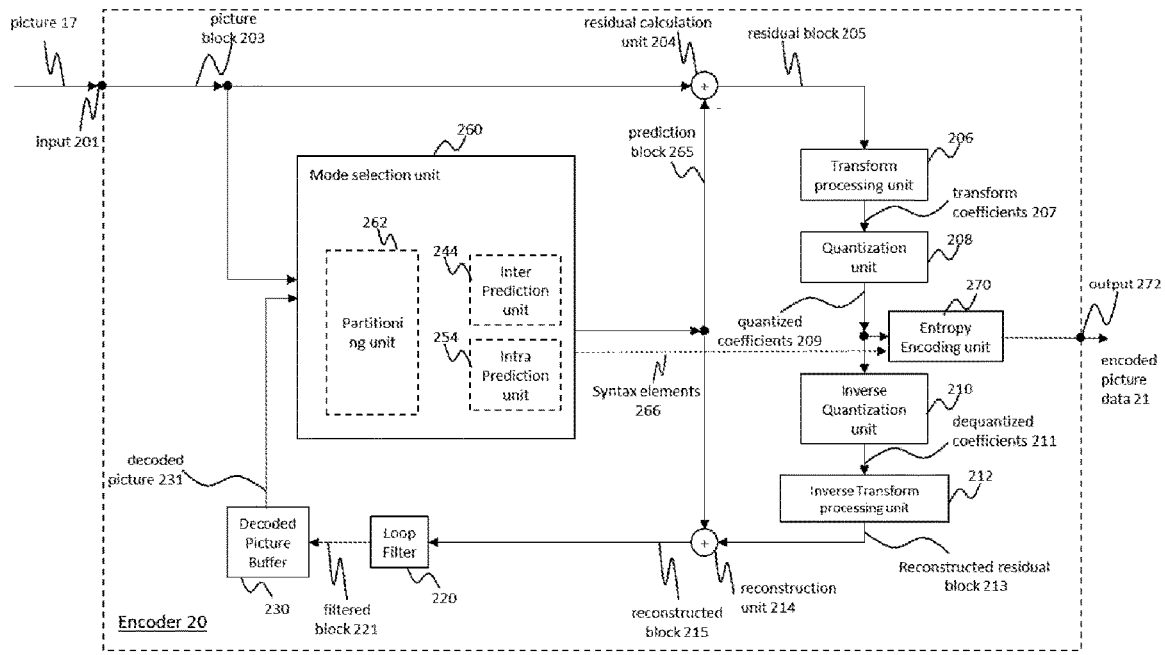
FIG. 2 is a block diagram showing an example of a video encoder configured to implement embodiments of the disclosure.

FIG. 2 shows a schematic block diagram of an example video encoder 20 that is configured to implement the techniques of the present disclosure. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
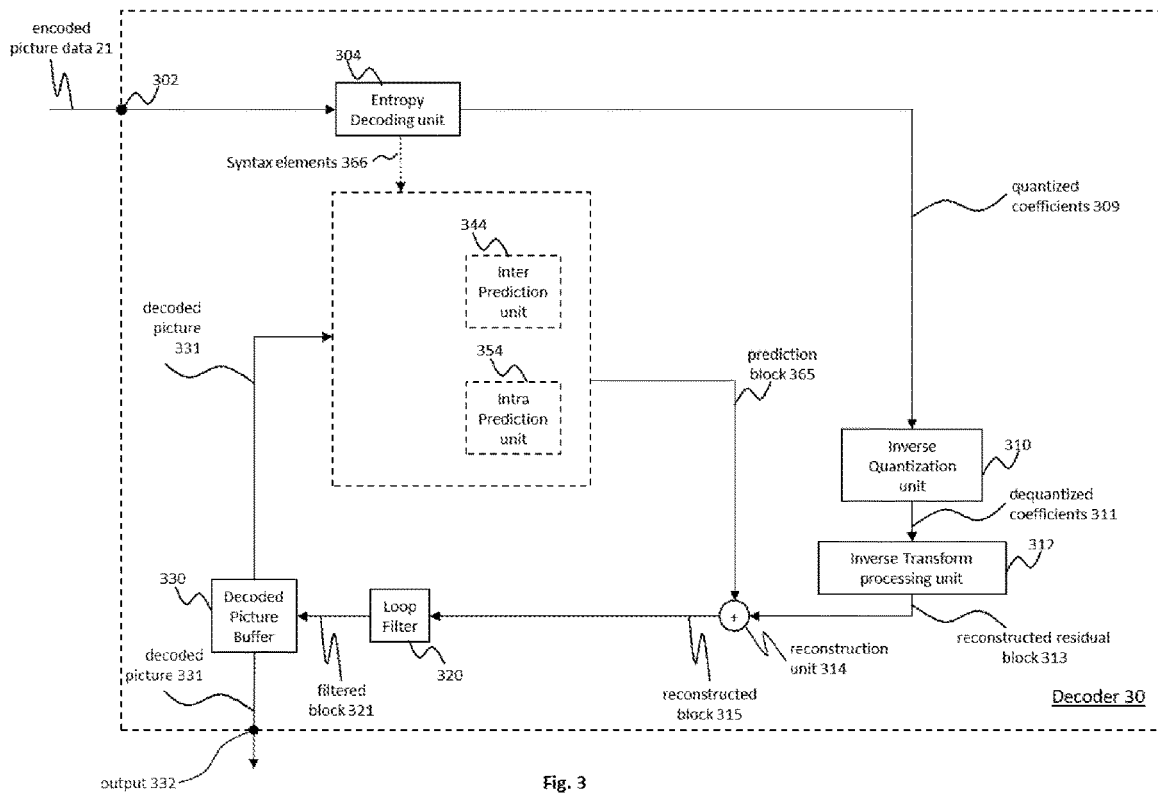
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture 17 (or picture data 17), e.g., picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, e.g., the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, e.g., the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g., the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively quantization unit 208) may be configured to output quantization parameters (QP), e.g., directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g., adder or summer 214) is configured to add the transform block 213 (e.g., reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, e.g., decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from decoded picture buffer 230 or other buffers (e.g., line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), e.g., select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g., a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (e.g., previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present disclosure. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (e.g., B, or P) slice, inter prediction unit 344 (e.g., motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is −2^(bitDepth−1)~2^(bitDepth−1)−1, where "^" means exponentiation. For example, if bitDepth is set equal to 16, the range is −32768~32767; if bitDepth is set equal to 18, the range is −13107~2131071. For example, the value of the derived motion vector (e.g., the MVs of four 4×4 sub-blocks within one 8×8 block) is constrained such that the max difference between integer parts of the four 4×4 sub-block MVs is no more than N pixels, such as no more than 1 pixel.

The following refers to two methods for constraining the motion vector according to the bitDepth.

Method 1: remove the overflow MSB (most significant bit) by flowing operations $$ux=(mvx+2^{bitDepth})\%2^{bitDepth} \quad (1)$$

$$mvx=(ux>=2^{bitDepth-1})?(ux-2^{bitDepth}) \quad (2)$$

$$uy=(mvy+2^{bitDepth})\%2^{bitDepth} \quad (3)$$

$$mvy=(uy>=2^{bitDepth-1})?(uy-2^{bitDepth}):uy \quad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111,1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\%2^{bitDepth} \quad (5)$$

$$mvx=(ux>=2^{bitDepth-1})?(ux-2^{bitDepth}) \quad (6)$$

$$uy=(mvpy+mvdy+2^{bitDepth})\%2^{bitDepth} \quad (7)$$

$$mvy=(uy>=2^{bitDepth-1})?(uy-2^{bitDepth}):uy \quad (8)$$

The operations may be applied during the sum of mvp and mvd, as shown in formula (5) to (8).

Method 2: remove the overflow MSB by clipping the value $$vx=Clip3(-2^{bitDepth-1},2^{bitDepth-1}-1,vx)$$

$$vy=Clip3(-2^{bitDepth-1},2^{bitDepth-1}-1,vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$Clip3(x, y, z) = \begin{cases} x & ; \quad z < x \\ y & ; \quad x > y \\ z & ; \quad \text{otherwise} \end{cases}$$

Figure 4:
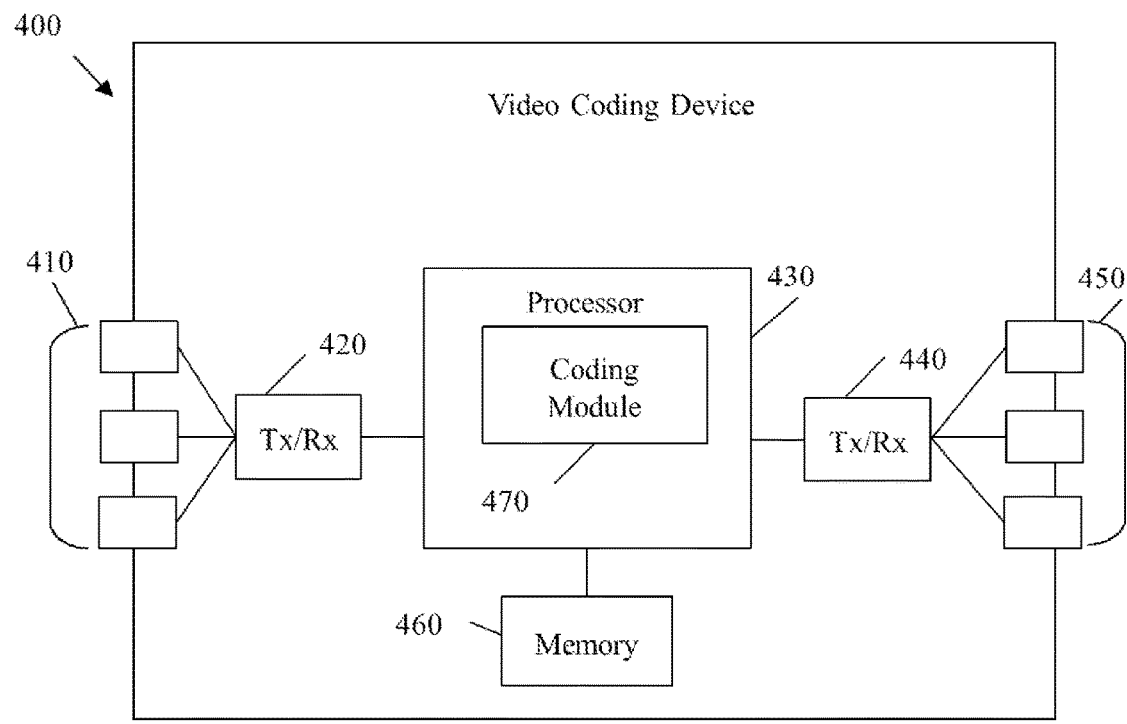
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
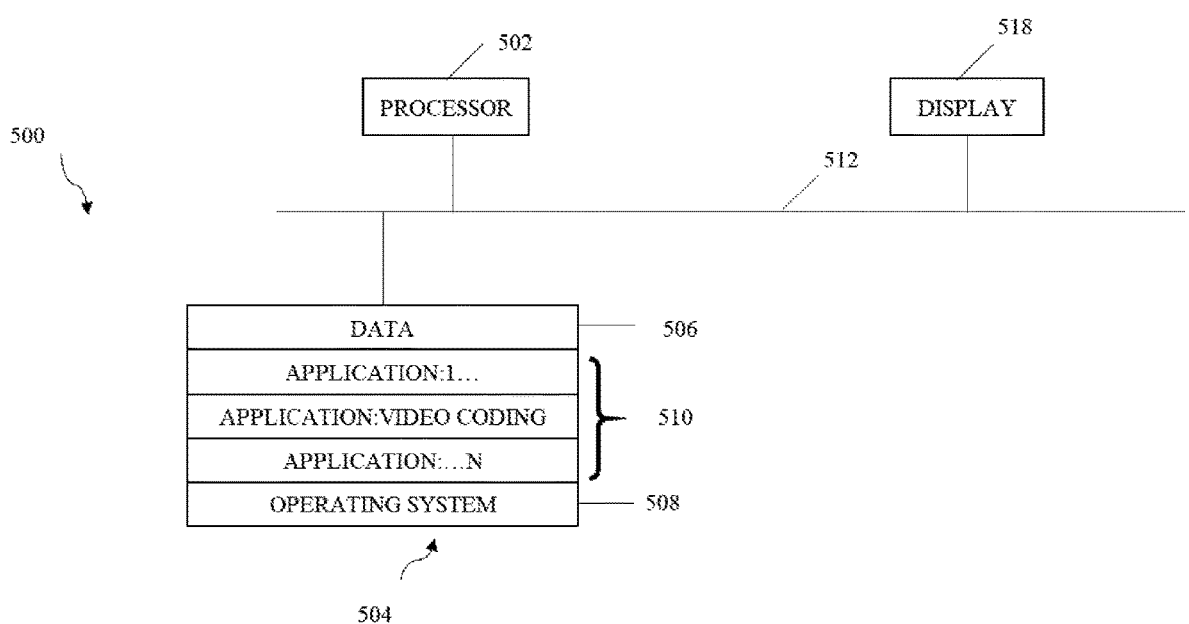
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Intra Prediction Modes

Figure 6:
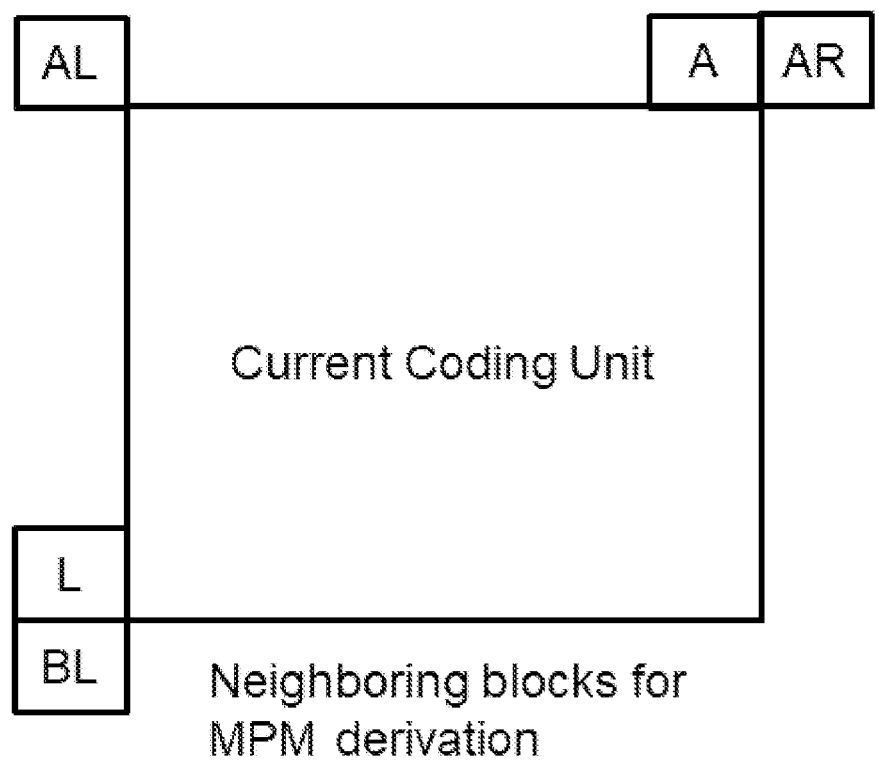
FIG. 6 is an example illustrating neighboring blocks of a current coding block or coding unit.
Figure 7:
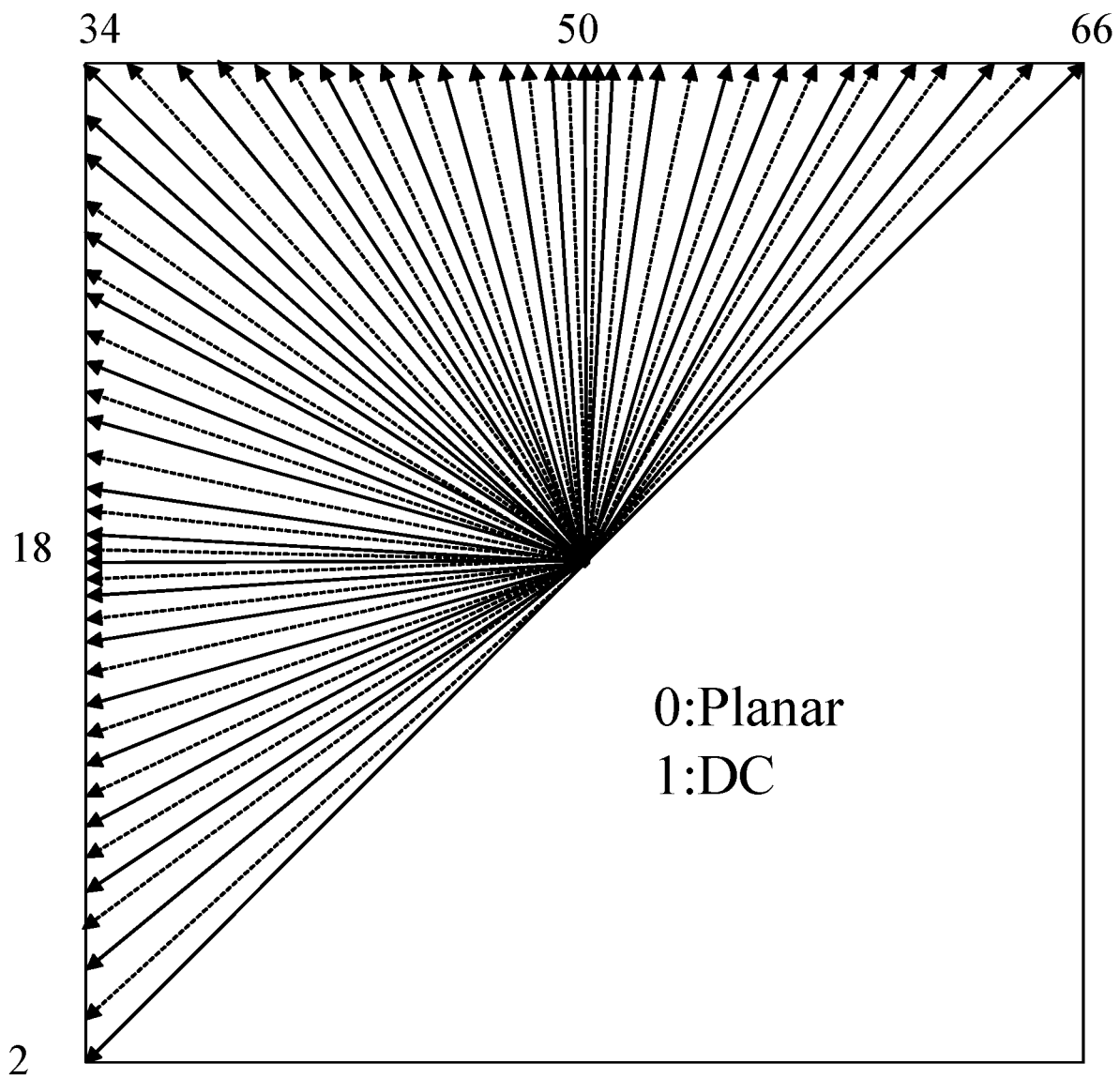
FIG. 7 is an example showing many intra prediction modes.

According to the HEVC/H.265 standard, 35 intra prediction modes are available. As shown in FIG. 6, this set contains the following modes: planar mode (the intra prediction mode index is 0), DC mode (the intra prediction mode index is 1), and directional (angular) modes that cover the 180° range and have the intra prediction mode index value range of 2 to 34 shown by black arrows in FIG. 6. To capture the arbitrary edge directions present in natural video, the number of directional intra modes is extended from 33, as used in HEVC, to 65. The additional directional modes are depicted as dotted arrows in FIG. 6, and the planar and DC modes remain the same. It is worth noting that the range that is covered by intra prediction modes can be wider than 180°. In particular, 62 directional modes with index values of 3 to 64 cover the range of approximately 230°, e.g., several pairs of modes have opposite directionality. In the case of the HEVC Reference Model (HM) and JEM platforms, only one pair of angular modes (namely, modes 2 and 66) has opposite directionality as shown in FIG. 6. For constructing a predictor, conventional angular modes take reference samples and (if needed) filter them to get a sample predictor. The number of reference samples required for constructing a predictor depends on the length of the filter used for interpolation (e.g., bilinear and cubic filters have lengths of 2 and 4, respectively).

FIG. 4 shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 6 refers to index 2 and the numbering of the indices being incremented until index 66 being the top right most angular mode of FIG. 6.

Most Probable Mode List Construction

Most Probable Mode (MPM) list is used in intra mode coding to improve coding efficiency. Due to the large number of intra modes (e.g., 35 in ITU H.265 and 67 in VVC), a Most Probable Mode list of current CU (coding unit) or CB (coding block) is constructed based on its neighboring CUs' or CBs' intra prediction modes. As current CU's or CB's intra mode is relevant to its neighbors CUs' or CBs' intra prediction modes, the MPM list usually provides a good prediction, s the intra mode of current CU or CB has a high chance falling into the MPM list. In this way, to derive the intra mode of current CU or CB, the index of MPM list is signaled. Compared to the number of total intra modes, the length of MPM list is much smaller (e.g., 3-MPM list is used in HEVC and 6-MPM list is used in VVC), thus less bits are required to code the intra mode. A flag (for example, mpm_flag) is used to indicate whether current CU's or CB's intra mode is in the MPM list or not. If the value of the flag is true (for example, the value is 1), the intra mode of current CU or CB is in the MPM list. If the value of the flag is false (for example, the value is 0), the intra mode of current CU or CB is not in the MPM list and the intra mode of current CU or CB is signaled using a binarized code.

MPM List Construction in VVC and ITU H.265

In VVC and ITU H.265, a MPM list is constructed based on the neighboring left and top blocks of the current block. When the left block and top block of the current block are unavailable for intra prediction, a mode list is used.

In one example for a 6-MPM list construction, a mode list might include the following intra prediction modes in order: (1) planar mode, (2) DC mode, (3) Vertical Mode, (4) Horizontal Mode, (5) V−4 mode (e.g., intra mode 46), (6) V+4 mode (e.g., intra mode 54). In another example for a 3-MPM list construction, a default mode list might include the following intra prediction modes in order: (1) planar mode, (2) DC mode.

Binarization of the Index of the Current Block when an Intra Mode of the Current Block is in the MPM List.

Binarization is used to convert decimal to binary representation. Many binarization approaches are used in ITU-T H.265 and VVC, such as fixed length code, truncated unary code, and truncated binary code. Truncated unary code is used to code an index corresponding to a 6-MPM list. Truncated unary binarization represents the mpm idx (suppose it is n, the value of n is ranged between 0 to 5, inclusive) with n 1 followed by 0, except the maximum value where all n bits are 1, or alternatively, with n 0 followed by 1, except the maximum value where all n bits are 0. The binarization code of mpm index with a maximum value of 5 is shown in Table 1,

TABLE 1

| Decimal value | Binary representation alternative 1 | Binary representation alternative 2 |
|---|---|---|
| 0 | 0 | 1 |
| 1 | 10 | 01 |
| 2 | 110 | 001 |
| 3 | 1110 | 0001 |
| 4 | 11110 | 00001 |
| 5 | 11111 | 00000 |

In the above examples, each decimal value is coded according to one more bit in the binary representation compared to the preceding decimal value (decimal value which is one less), except for the last decimal value which corresponds to the maximum value of the index.

Multi-Hypothesis Prediction

A coding block is either intra-predicted (e.g., using the reference samples in the same picture) or inter-predicted (e.g., using the reference samples in other pictures). The multi-hypothesis prediction combines these two prediction approaches. Therefore, it is sometimes also called as combined inter-intra prediction. When combined inter-intra prediction is enabled, the intra-predicted and inter-predicted samples are applied by weights, and the final prediction for a coding block is derived as the weighted average samples.

In VTM 3.0, if multi-hypothesis (MH) prediction is enabled, 4 or 3 intra modes based on block shape is used. In 4 intra modes case, PLANAR, DC, vertical (corresponding to value 50), and horizontal modes (corresponding to 18) are used. In 3 intra modes case, when the CU or CB width is larger than the double of CU or CB height, horizontal mode is exclusive of the intra mode list; when the CU or CB height is larger than the double of CU or CB width, vertical mode is removed from the intra mode list. For both cases of 3 and 4 intra modes, only these four intra modes (e.g., PLANAR, DC, vertical, and horizontal) are allowed and a 3-MPM list is defined.

MEI Blocks: The Coding Blocks of the Luma Component that are Predicted by Multi-Hypothesis Prediction.

Intra blocks: The coding blocks that are predicted by intra prediction but not predicted by multi-hypothesis prediction. The MPM list construction for MH blocks is different from the MPM list construction for intra blocks in VTM3.0. In an example, a 6-MPM list is constructed and 67 intra modes may be used for intra prediction. The MPM list construction for intra blocks is constructed based on the left block's and above block's intra prediction modes, if the left block's intra prediction mode and the above block's intra prediction mode are not available, a six-entry default mode list {PLANAR, DC, vertical, horizontal, vertical−4, vertical+4} may be used.

In another aspect, the binarization for a mpm list index of MH blocks is different from the binarization for a mpm list index of an intra blocks. First, for MH blocks, a 3-MPM list is defined and the maximum value of mpm list index is 2, while for intra blocks, a 6-MPM list is defined and the maximum value of mpm list index is 5. Second, in 3 or 4 intra mode cases the index binarization for MH blocks is combined with the signaling of mpm_flag. When in the 3 intra mode case, mpm_flag is not signaled but inferred as true, since the intra mode should fall into the 3-MPM list after excluding horizontal or vertical modes. When in the 4 intra mode case, mpm_flag is signaled, if the value of the mpm_flag true (for example, the value of the mpm_flag is 1), mpm_idx is coded with truncated unary code, maximum value of the truncated unary code is 2; if the value of the mpm_flag is false (for example, the value of the mpm_flag is 0), the intra mode is obtained by excluding the 3 intra modes in the 3-MPM list from the 4 modes {PLANAR, DC, vertical, and horizontal}.

The binarization of MPM list index of MH blocks, as well as mpm_flag signaling for 3 and 4 intra mode cases are represented by Table 2.

TABLE 2

| Mpm index | 3 intra mode case | 4 intra mode case |
|---|---|---|
| 0 | 0 | 0 |
| 1 | 10 | 10 |
| 2 | 11 | 11 |
| Mpm flag | | |
| 0 | — (not exist, always 1) | Excluding 3 MPM modes from {PLANAR, DC, vertical, and horizontal} |
| 1 | use index to indicate intra mode in the 3-MPM list | use index to indicate intra mode in the 3-MPM list |

The block-based approach in VTM differentiating 3 or 4 MPM for MH blocks increases the decoding complexity, and might not be necessary for blocks applied with multi-hypothesis prediction (e.g., combined inter-intra prediction).

Embodiment of the present disclosure provides several alternatives for reducing the complexity of decoding a block of a picture through MH prediction, especially benefited from the simplifications of the MPM list construction for MH blocks.

Embodiment 1

Determining whether multi-hypothesis prediction is applied to a coding block or not;
    If multi-hypothesis prediction is applied to predict the coding block,
        Using a first MPM list with a pre-defined default list of modes for intra prediction, which has a size of N (N is larger than 0).
        Predicting the block based on one of the entries of the first MPM list.
    If multi-hypothesis prediction is not applied to predict the coding block, and if intra prediction is applied to predict the block,
        Predicting the block based on one of the entries of a second MPM list (in an example, the second MPM list is constructed according to the method which is disclosed in JVET-L1001).

In one implementation, the default mode list has a length of 4, and the list is comprised of following entries with the specified order, Planar mode, DC mode, vertical mode, and horizontal mode.

In one implementation, the default mode list has a length of 3, and the list is comprised of following entries with the specified order, Planar mode, DC mode, vertical mode.

In one implementation, the default mode list has a length of 2, and the list is comprised of following entries with the specified order, Planar mode, DC mode.

In one implementation, the default mode list has a length of 1, and the list is comprised of Planar mode only.

In one implementation, the binarization of mpm list index uses truncated unary code, the maximum value of the truncated unary code is 3, when a first MPM list has 4 intra modes, and the mpm_flag is always set to true (the value of the mpm_flag is 1).

In another implementation, the first 4 candidates in the default mode list are used to construct a first MPM list that has four intra modes. The order of the 4 candidates in the default mode list are same as the order of the candidates in the first MPM list. As an example if the default mode list comprises the following intra prediction modes:
1. planar mode,
2. DC mode,
3. Vertical Mode,
4. Horizontal Mode,
5. V−4 mode,
6. V+4 mode,
then the first MPM list comprises the following intra prediction modes in order:
1. planar mode,
2. DC mode,
3. Vertical Mode,
4. Horizontal Mode.

In one implementation, the first 3 candidates in the default mode list are used to construct a first MPM list that has 3 intra modes.

In one implementation, the binarization of mpm list index uses truncated unary code, the maximum value of the truncated unary code is 2, when a first MPM list has 3 intra modes, and the mpm_flag is always set to true (the value of the mpm_flag is 1).

In another implementation, the first 3 candidates in the default mode list are used to construct a first MPM list that has 3 intra modes. The order of the 3 candidates in the default mode list are same as the order of the candidates in the first MPM list. As an example, if the default mode list comprises the following intra prediction modes:
1. planar mode,
2. DC mode,
3. Vertical Mode,
4. Horizontal Mode,
5. V−4 mode,
6. V+4 mode,
then the first MPM list comprises the following intra prediction modes in order:
1. planar mode,
2. DC mode,
3. Vertical Mode In one implementation, the first 2 candidates in the default mode list are used to construct a first MPM list that has 2 intra modes.

In one implementation, the binarization of mpm list index uses truncated unary code with a maximum value of 1, when a first MPM list has 2 intra modes, and the mpm_flag is always set to true (the value of the mpm_flag is 1).

In another implementation, the first 2 candidates in the default mode list are used to construct a first MPM list that has 2 intra modes. The order of the 2 candidates in the default mode list are same as the order of the candidates in the first MPM list. As an example, if the default mode list comprises the following intra prediction modes:
1. planar mode,
2. DC mode,
3. Vertical Mode,
4. Horizontal Mode,
5. V−4 mode,
6. V+4 mode,
then the first MPM list comprises the following intra prediction modes in order:
1. planar mode,
2. DC mode, In one implementation, the first one candidate in the default mode list is used to construct a first MPM list that has one intra mode. In one example, the mode that is inserted in the first MPM list is Planar mode.

In one implementation, mpm_idx is not signaled if a first MPM list has one intra mode and is coded with a fixed intra mode, and the mpm_flag is always set to true (the value of the mpm_flag is 1).

In another implementation, the first candidate in the default mode list is used to construct a first MPM list that has one intra mode. As an example, if the default mode list comprises the following intra prediction modes:
1. planar mode,
2. DC mode,
3. Vertical Mode,
4. Horizontal Mode,
5. V−4 mode,
6. V+4 mode,
then the first MPM list comprises the following intra prediction modes in order:
1. planar mode, The second MPM list could be constructed according to the methods in the ITU-T H.265 and in the VVC, see the above examples and disclosures about the MPM list construction process in ITU-T H.265 and in VVC.

Embodiment 2

Constructing a first MPM list (in an example, the first MPM list is constructed according to the method which is disclosed in JVET-L1001)
Determining whether multi-hypothesis prediction is applied to a coding block or not;
If multi-hypothesis prediction is applied to predict the coding block,
Predicting the block based on one of the entries in the first MPM list.
If multi-hypothesis prediction is not applied to predict the coding block, and if intra prediction is applied to predict the block,
Predicting the block based on one of the entries of the first MPM list.

In one implementation the intra prediction based on one of the entries in a first MPM list is performed as follows:
Operation 1: construct all of the entries of the first MPM list
Operation 2: determine whether a block applies multi-hypothesis prediction or not
Operation 3:
multi-hypothesis prediction is applied to predict the coding block
Parse an index indication from a bitstream, whose maximum value is known as (N−1), N is equal to or larger than 1. When N is 1, the index indication is inferred (but not parsed) as 0.
Derive an intra prediction mode according to the first MPM list and the derived index indication. The derived intra prediction mode is the entry in the first MPM list indexed by the index indication
if the derived intra prediction mode is an angular mode with mode index (a corresponding value of intra mode) between 2 and 34, inclusive, the derived intra prediction is changed to a horizontal mode otherwise if the derived intra prediction is an angular mode with mode index between 35 and 66, inclusive, the derived intra prediction is changed to a vertical mode If multi-hypothesis prediction is not applied to predict the block and if the block is applied with intra prediction Parse an index indication from a bitstream, whose maximum value is known as (M−1), M is equal to or larger than 1.

Derive an intra prediction mode according to the first MPM list and the derived index indication. The derived intra prediction mode is the entry in the first MPM list indexed by the index indication Operation 4: Predicting the block based on the derived intra mode.

In one implementation the intra prediction based on one of the entries in a first MPM list is performed as follows:

Operation 1: construct all of the entries of the first MPM list

Operation 2: determine whether a block applies multi-hypothesis prediction or not Operation 3:

If multi-hypothesis prediction is applied to predict the coding block

Parse an index indication from a bitstream, whose maximum value is known as (N−1), N is equal to or larger than 1. When N is 1, the index indication is inferred (but not parsed) as 0.

Derive an intra prediction mode according to the first MPM list and the derived index indication. The derived intra prediction mode is the entry in the first MPM list indexed by the index indication if the derived intra prediction mode is an angular mode with mode index (a corresponding value of intra mode) between 2 and 33, inclusive, the derived intra prediction is changed to a horizontal mode otherwise if the derived intra prediction is an angular mode with mode index between 34 and 66, inclusive, the derived intra prediction is changed to a vertical mode If multi-hypothesis prediction is not applied to predict the block and if the block is applied with intra prediction Parse an index indication from a bitstream, whose maximum value is known as (M−1), M is equal to or larger than 1.

Derive an intra prediction mode according to the first MPM list and the derived index indication. The derived intra prediction mode is the entry in the first MPM list indexed by the index indication Operation 4: Predicting the block based on the derived intra mode In one implementation the intra prediction based on one of the entries in a first MPM list is performed as follows:

Operation 1: construct all of the entries of the first MPM list

Operation 2: determine whether a block applies multi-hypothesis prediction or not Operation 3:

If multi-hypothesis prediction is applied to predict the coding block

Parse an index indication from a bitstream, whose maximum value is known as (N−1), N is equal to or larger than 1. When N is 1, the index indication is inferred (but not parsed) as 0.

Derive an intra prediction mode according to the first MPM list and the derived index indication. The derived intra prediction mode is the entry in the first MPM list indexed by the index indication if the derived intra prediction mode is an angular mode with mode index (a corresponding value of intra mode) between 2 and 66, inclusive, the derived intra prediction is changed to a Planar mode Predicting the block based on the derived intra mode.

If multi-hypothesis prediction is not applied to predict the block and if the block is applied with intra prediction Parse an index indication from a bitstream, whose maximum value is known as (M−1), M is equal to or larger than 1.

Derive an intra prediction mode according to the first MPM list and the derived index indication. The derived intra prediction mode is the entry in the first MPM list indexed by the index indication Operation 4: Predicting the block based on the derived intra mode.

Embodiment 3

Determining whether a block applies multi-hypothesis prediction or not;

If multi-hypothesis prediction is applied to predict the block,

Constructing the first N entries of a first MPM list (in an example, the first MPM list is constructed according to the method which is disclosed in JVET-L1001).

Predicting the block based on one of the entries of the first MPM list.

If multi-hypothesis prediction is not applied to predict the block and if the block is applied with intra prediction Constructing all of the entries of a first MPM list (in an example, the first MPM list is constructed according to the method which is disclosed in JVET-L1001).

Predicting the block based on one of the entries of the first MPM list.

In one implementation, the first MPM list comprises only Planar, DC, Vertical and Horizontal intra prediction modes.

In one implementation the intra prediction based on one of the entries in a first MPM list is performed as follows:

Operation 1: determine whether a block applies multi-hypothesis prediction or not Operation 2:

If multi-hypothesis prediction is applied to predict the coding block construct first N entries of the first MPM list, namely, construct first N entries of the first MPM list according to the constructing rule of the first MPM list. When the first N entries can be determined, stop constructing other entries of the first MPM list.

Parse an index indication from a bitstream, whose maximum value is known as (N−1), N is equal to or larger than 1. When N is 1, the index indication is inferred (but not parsed) as 0.

Derive an intra prediction mode according to first N entries of the first MPM list and the derived index indication. The derived intra prediction mode is the entry of the first N entries of in the first MPM list indexed by the index indication if the derived intra prediction mode is an angular mode with mode index (a corresponding value of intra mode) between 2 and 33, inclusive, the derived intra prediction is changed to a horizontal mode (corresponds to a value 18)

otherwise if the derived intra prediction is an angular mode with mode index between 34 and 66, inclusive, the derived intra prediction is changed to a vertical mode (corresponds to a value 50)

If multi-hypothesis prediction is not applied to predict the block and if the block is applied with intra prediction construct all M entries of the first MPM list.

Parse an index indication from a bitstream, whose maximum value is known as (M−1), M is equal to or larger than 1.

Derive an intra prediction mode according to the first MPM list and the derived index indication. The derived intra prediction mode is the entry in the first MPM list indexed by the index indication Operation 3: Predicting the block based on the derived intra mode.

In one implementation the intra prediction based on one of the entries in a first MPM list is performed as follows:

Operation 1: determine whether a block applies multi-hypothesis prediction or not Operation 2:

If multi-hypothesis prediction is applied to predict the coding block construct first N entries of the first MPM list, namely, construct first N entries of the first MPM list according to the constructing rule of the first MPM list. When the first N entries can be determined, stop constructing other entries of the first MPM list Parse an index indication from a bitstream, whose maximum value is known as (N−1), N is equal to or larger than 1. When N is 1, the index indication is inferred (but not parsed) as 0.

Derive an intra prediction mode according to first N entries of the first MPM list and the derived index indication. The derived intra prediction mode is the entry of the first N entries of in the first MPM list indexed by the index indication if the derived intra prediction mode is an angular mode with mode index (a corresponding value of intra mode) between 2 and 34, inclusive, the derived intra prediction is changed to a horizontal mode (corresponds to a value 18)

otherwise if the derived intra prediction is an angular mode with mode index between 35 and 66, inclusive, the derived intra prediction is changed to a vertical mode (corresponds to a value 50)

If multi-hypothesis prediction is not applied to predict the block and if the block is applied with intra prediction construct all M entries of the first MPM list Parse an index indication from a bitstream, whose maximum value is known as (M−1), M is equal to or larger than 1.

Derive an intra prediction mode according to the first MPM list and the derived index indication. The derived intra prediction mode is the entry in the first MPM list indexed by the index indication Operation 3: Predicting the block based on the derived intra mode.

In one implementation the intra prediction based on one of the entries in a first MPM list is performed as follows:

Operation 1: determine whether a block applies multi-hypothesis prediction or not Operation 2:

If multi-hypothesis prediction is applied to predict the coding block construct first N entries of the first MPM list, namely, construct first N entries of the first MPM list according to the constructing rule of the first MPM list. When the first N entries can be determined, stop constructing other entries of the first MPM list Parse an index indication from a bitstream, whose maximum value is known as (N−1), N is equal to or larger than 1. When N is 1, the index indication is inferred (but not parsed) as 0.

Derive an intra prediction mode according to first N entries of the first MPM list and the derived index indication. The derived intra prediction mode is the entry of the first N entries of in the first MPM list indexed by the index indication if the derived intra prediction mode is an angular mode with mode index (a corresponding value of intra mode) between 2 and 66, inclusive, the derived intra prediction is changed to a Planar mode (corresponds to a value 0)

If multi-hypothesis prediction is not applied to predict the block and if the block is applied with intra prediction construct all M entries of the first MPM list Parse an index indication from a bitstream, whose maximum value is known as (M−1), M is equal to or larger than 1.

Derive an intra prediction mode according to the first MPM list and the derived index indication. The derived intra prediction mode is the entry in the first MPM list indexed by the index indication Operation 3: Predicting the block based on the derived intra mode.

In one implementation the first MPM list is constructed based on the first N entries of the second MPM list as follows:

Operation 1: go to the first entry of the second MPM list

Operation 2.1: if the entry is Planar mode or DC mode, insert the entry in the first MPM list.

Operation 2.2: otherwise if the entry is an angular mode with mode index between 2 and 33, inclusive, insert a horizontal mode in the first MPM list.

Operation 2.3: otherwise if the entry is an angular mode with mode index between 34 and 66, inclusive, insert a vertical mode in the first MPM list.

Operation 3: go to the next entry in the second MPM list restart with operation 2.1 until the number of entries in the first MPM list is equal to a specified maximum value.

In one implementation the first MPM list is constructed based on the first N entries of the second MPM list as follows:

Operation 1: go to the first entry of the second MPM list

Operation 2.1: if the entry is Planar mode or DC mode, insert the entry in the first MPM list.

Operation 2.2: otherwise if the entry is an angular mode with mode index between 2 and 34, inclusive, and if the horizontal mode has not been inserted, insert a horizontal mode in the first MPM list.

Operation 2.3: otherwise if the entry is an angular mode with mode index between 35 and 66, inclusive, and if the vertical mode has not been inserted, insert a vertical mode in the first MPM list.

Operation 3: go to the next entry in the second MPM list restart with operation 2.1 until the number of entries in the first MPM list is equal to a specified maximum value or the first N entries of the second MPM list have been all iterated.

Operation 4: fill one or more default modes that have not been inserted into the first MPM list.

In one implementation the first MPM list is constructed based on the first N entries of the second MPM list as follows:

Operation 1: go to the first entry of the second MPM list

Operation 2.1: if the entry is Planar mode or DC mode, insert the entry in the first MPM list.

Operation 2.2: otherwise if the entry is an angular mode with mode index between 2 and 33, inclusive, and if the horizontal mode has not been inserted, insert a horizontal mode in the first MPM list.

Operation 2.3: otherwise if the entry is an angular mode with mode index between 34 and 66, inclusive, and if the vertical mode has not been inserted, insert a vertical mode in the first MPM list.

Operation 3: go to the next entry in the second MPM list restart with operation 2.1 until the number of entries in the first MPM list is equal to a specified maximum value or the first N entries of the second MPM list have been all iterated.

Operation 4: fill one or more default modes that have not been inserted into the first MPM list.

In one implementation the first MPM list is constructed based on the first N entries of the second MPM list as follows:

Operation 1: go to the first entry of the second MPM list

Operation 2.1: if the entry is Planar mode or DC mode, insert the entry in the first MPM list.

Operation 2.2: otherwise if the entry is an angular mode with mode index between 2 and 66, inclusive, and if a default mode has not been inserted, insert a default mode in the first MPM list.

Operation 3: go to the next entry in the second MPM list restart with operation 2.1 and fill with different default modes until the number of entries in the first MPM list is equal to a specified maximum value.

Embodiment 4

Determining whether multi-hypothesis prediction is applied to a coding block or not;

If multi-hypothesis prediction is applied to predict the coding block,

Using a first MPM list with a pre-defined default list (for example, a default_list[N]) of modes for intra prediction, which has a size of N (N is larger than 0).

Set mpm_flag as true, e.g., the mpm_flag is inferred as 1. mpm_flag indicates whether the current block's intra mode is in the MPM List or not. When mpm_flag is equal to 1, the intra mode of current block is in the MPM list, when mpm_flag is equal to 0, the intra mode of current block is not in the MPM list.

Parse a mpm_idx which have value between 0 to N−1 (includes 0 and N−1). If N is 1, the mpm_idx is not parsed but as inferred as 0.

obtain the intra mode of current block with default_list[mpm_idx].

Predicting the block based on the obtained intra mode.

In an example, there is no block based binarization and MPM list construction in the embodiment.

In one implementation, the default mode list has a length of 4, and the list is comprised of following entries with the specified order, Planar mode, DC mode, vertical mode, and horizontal mode.

In one implementation, the default mode list has a length of 3, and the list is comprised of following entries with the specified order, Planar mode, DC mode, vertical mode.

In one implementation, the default mode list has a length of 3, and the list is comprised of following entries with the specified order, Planar mode, horizontal mode (e.g., 18), and vertical mode (e.g., 50).

In one implementation, the default mode list has a length of 3, and the list is comprised of following entries with the specified order, Planar mode, vertical mode, and horizontal mode.

In one implementation, the default mode list has a length of 2, and the list is comprised of following entries with the specified order, Planar mode, DC mode.

In one implementation, the default mode list has a length of 1, and the list is comprised of Planar mode only.

In one implementation, the binarization of mpm list index uses truncated unary code, the maximum value of the truncated unary code is 3, when a first MPM list has 4 intra modes, and the mpm_flag is always set to true (the value of the mpm_flag is 1).

In one implementation, the mpm_flag is always set to true (the value of the mpm_flag is 1). The binarization of mpm list index uses truncated unary code, and all the bins are CABAC by-pass coded. The default MPM list has a size of 3, and maximum value of the truncated unary code is 2, when a first MPM list has 3 intra modes with the following order: Planar mode, horizontal (e.g., 18) mode, and vertical (e.g., 50) mode.

In one implementation, the mpm_flag is always set to true (the value of the mpm_flag is 1). The binarization of mpm list index uses truncated unary code, and all the bins are CABAC by-pass coded. The default MPM list has a size of 3, and maximum value of the truncated unary code is 2, when a first MPM list has 3 intra modes with the following order: Planar mode, vertical (e.g., 50) mode, and horizontal (e.g., 18) mode.

The second MPM list could be constructed according to the methods in the ITU-T H.265 and in the VVC, see the above examples and disclosures about the MPM list construction process in ITU-T H.265 and in VVC.

Embodiment 5

Figure 8:
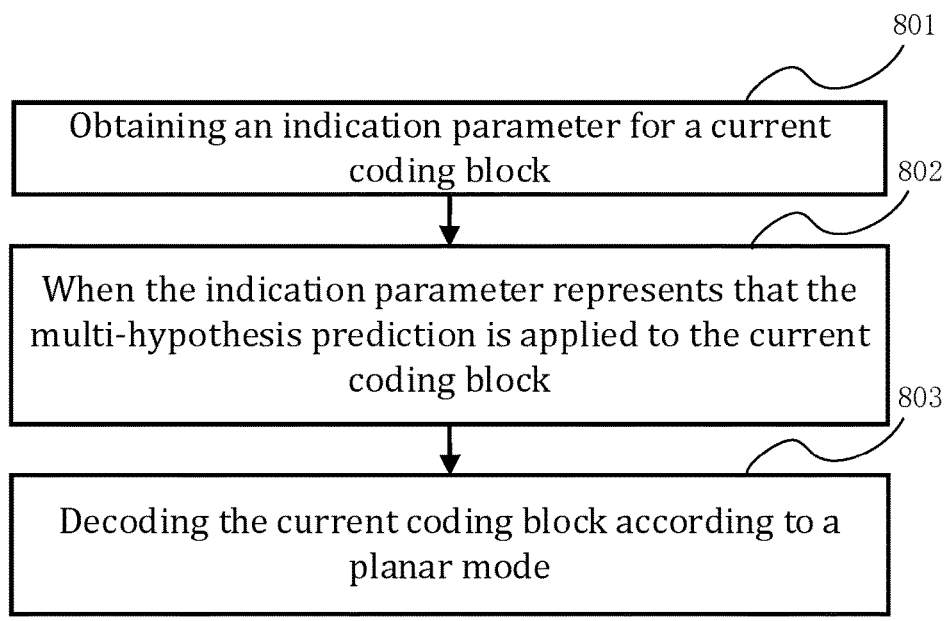
FIG. 8 is an example illustrating a method of decoding a block of a picture.

As shown in FIG. 8, a method of decoding a block of a picture, comprising:

Operation 801: obtaining an indication parameter for a current coding block, wherein the indication parameter represents whether a multi-hypothesis prediction is applied to the current coding block;

Operation 802: when the indication parameter represents that the multi-hypothesis prediction is applied to the current coding block;

Operation 803: decoding the current coding block according to a planar mode.

In one implementation, the multi-hypothesis prediction is combined inter and intra prediction (CIIP).

In one implementation, the indication parameter is CIIP flag.

In one implementation, merge data is used to carry the indication parameter. It means that the indication parameter is derived from the merge data syntax.

In one implementation, after applying the multi-hypothesis prediction to the current coding block based on a value of the indication parameter, the method further comprises obtaining an intra prediction mode for the current coding block according to a most probable mode (MPM) list and a MPM list index. In one embodiment, obtaining an intra prediction mode for the current coding block according to a MPM list and a MPM list index through the following operations: indexing each of the intra prediction mode in the MPM list with a corresponding value of MPM list index; parsing the MPM list index from a bitstream, which has value between 0 to N−1; obtaining the intra prediction mode of current block from the MPM list according to the value of the MPM list index.

In one implementation, the MPM list comprises at least planar mode.

In another implementation, the MPM list comprises planar mode and at least one of DC mode, vertical mode and horizontal mode.

In another implementation, the MPM list consist of planar mode.

In one implementation, the method further comprises selecting planar mode for the current coding block from the MPM list according to the value of the MPM list index.

In one implementation, the MPM list is constructed from a pre-defined default list (for example, a default mode list) of modes for intra prediction, which has a size greater than N.

In one implementation, the MPM list index is coded into decimal or binary representation.

In one implementation, the binarization of MPM list index uses truncated unary code.

In one implementation, the first 4 candidates in the default mode list are used to construct a MPM list that has four intra modes. The order of the 4 candidates in the default mode list are same as the order of the candidates in the MPM list. As an example if the default mode list comprises the following intra prediction modes:
1. planar mode,
2. DC mode,
3. Vertical Mode,
4. Horizontal Mode,
5. V−4 mode,
6. V+4 mode,
then the MPM list comprises the following intra prediction modes in order:
1. planar mode,
2. DC mode,
3. Vertical Mode,
4. Horizontal Mode.

In one implementation, the first 3 candidates in the default mode list are used to construct a MPM list that has 3 intra modes.

In one implementation, the binarization of mpm list index uses truncated unary code, the maximum value of the truncated unary code is 2, when a MPM list has 3 intra modes, and the mpm_flag is always set to true (the value of the mpm_flag is 1).

In another implementation, the first 3 candidates in the default mode list are used to construct a MPM list that has 3 intra modes. The order of the 3 candidates in the default mode list are same as the order of the candidates in the MPM list. As an example, if the default mode list comprises the following intra prediction modes:
1. planar mode,
2. DC mode,
3. Vertical Mode,
4. Horizontal Mode,
5. V−4 mode,
6. V+4 mode,
then the MPM list comprises the following intra prediction modes in order:
1. planar mode,
2. DC mode,
3. Vertical Mode In one implementation, the first 2 candidates in the default mode list are used to construct a MPM list that has 2 intra modes.

In one implementation, the binarization of mpm list index uses truncated unary code with a maximum value of 1, when a MPM list has 2 intra modes, and the mpm_flag is always set to true (the value of the mpm_flag is 1).

In another implementation, the first 2 candidates in the default mode list are used to construct a MPM list that has 2 intra modes. The order of the 2 candidates in the default mode list are same as the order of the candidates in the MPM list. As an example, if the default mode list comprises the following intra prediction modes:
1. planar mode,
2. DC mode,
3. Vertical Mode,
4. Horizontal Mode,
5. V−4 mode,
6. V+4 mode,
then the MPM list comprises the following intra prediction modes in order:
1. planar mode,
2. DC mode, In one implementation, the first one candidate in the default mode list is used to construct a MPM list that has one intra mode. In one example, the mode that is inserted in the MPM list is Planar mode.

In another implementation, the first candidate in the default mode list is used to construct a MPM list that has one intra mode. As an example, if the default mode list comprises the following intra prediction modes:
1. planar mode,
2. DC mode,
3. Vertical Mode,
4. Horizontal Mode,
5. V−4 mode,
6. V+4 mode,
then the MPM list comprises the following intra prediction mode:
1. planar mode.

The above embodiments are also applicable to a method of encoding a block of a picture.

In one implementation, the binarization of mpm list index uses truncated unary code, maximum value of the truncated unary code is N−1 when a first MPM list has N intra modes, and the mpm_flag is always set to true. If N equals to 1, mpm_idx is not signaled.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, e.g., the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g., residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Following is an explanation of the applications of the coding method as well as the decoding method as shown in the above-mentioned embodiments, and a system using them.

Figure 9:
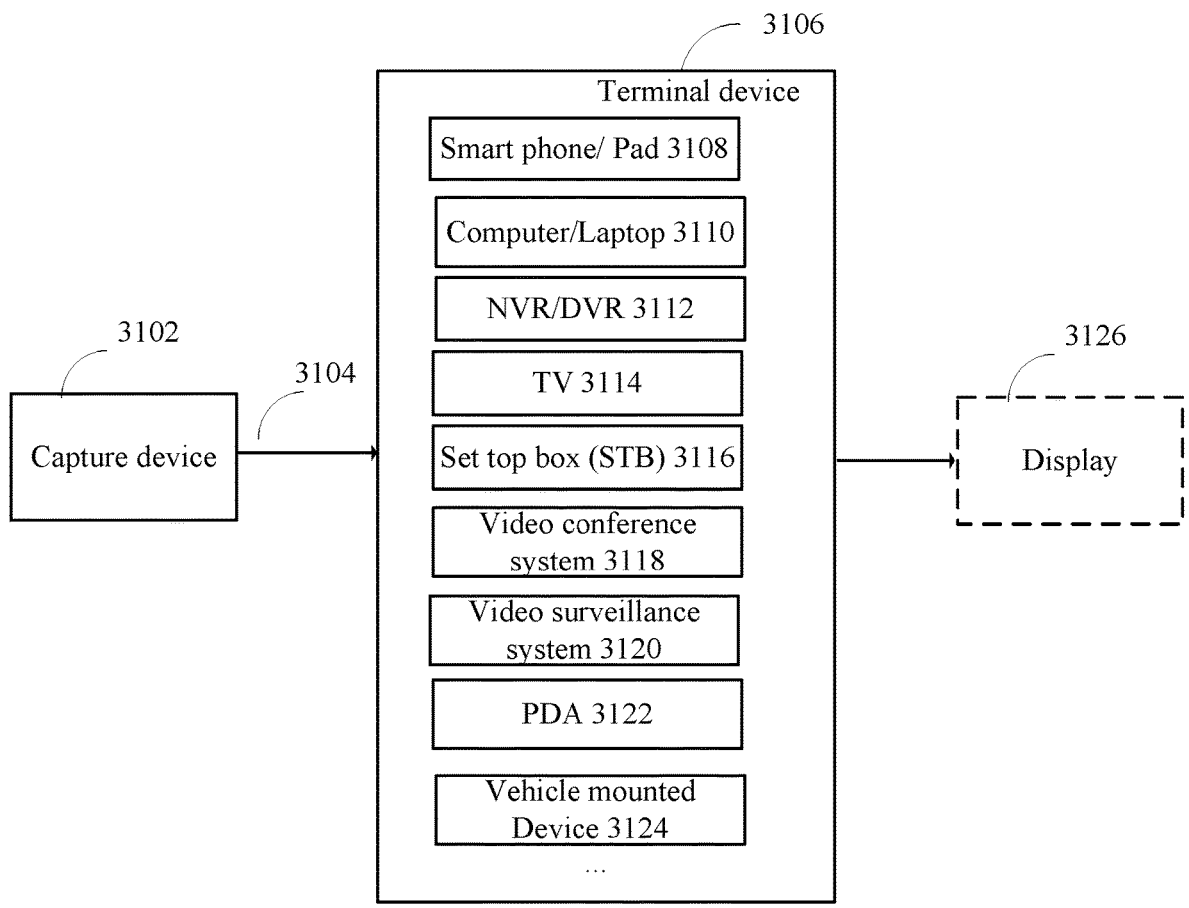
FIG. 9 is a block diagram showing an example structure of a content supply system 3100 which realizes a content delivery service.

FIG. 9 is a block diagram showing a content supply system 3100 for realizing content distribution service. This content supply system 3100 includes capture device 3102, terminal device 3106, and includes display 3126 in an embodiment. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may code the data by the coding method as shown in the above embodiments. Alternatively, the capture device 3102 may distribute the data to a streaming server (not shown in the Figures), and the server codes the data and transmits the coded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video coding processing. When the data includes audio (e.g., voice), an audio encoder included in the capture device 3102 may actually perform audio coding processing. For some practical scenarios, the capture device 3102 distributes the coded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the coded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned coded data. For example, the terminal device 3106 may include the destination device 14 as described above. When the coded data includes video, the video decoder 30 included in the terminal device is prioritized to perform video decoding. When the coded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs coding or decoding, the picture coding device or the picture decoding device, as shown in the above-mentioned embodiments, can be used.

Figure 10:
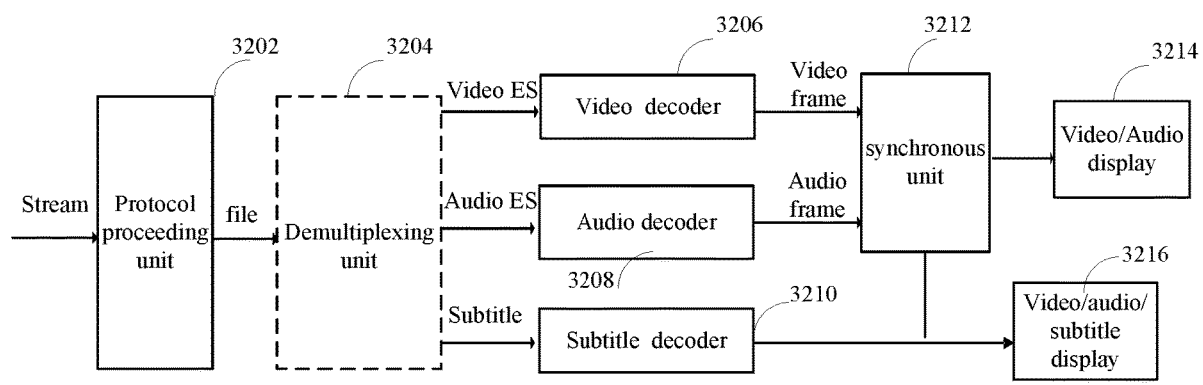
FIG. 10 is a block diagram showing a structure of an example of a terminal device.

FIG. 10 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the coded audio data and the coded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and subtitles are generated in an embodiment. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 10) before feeding it to the synchronous unit 3212. Similarly, the audio frame may store in a buffer (not shown in FIG. before feeding it to the synchronous unit 3212.

The synchronous unit 3212 synchronizes the video frame and the audio frame, and supplies the video/audio to a video/audio display 3214, via graphics processing unit (GPU) in an embodiment. For example, the synchronous unit 3212 synchronizes the presentation of the video and audio information, while ensuring that data buffers in the decoders do not overflow or underflow. Information may code in the syntax using time stamps concerning the presentation of coded audio and visual data and time stamps concerning the delivery of the data stream itself. Time stamps are generally in units of 90 kHz, but the System Clock Reference (SCR), the Program Clock Reference (PCR) and the optional Elementary Stream Clock Reference (ESCR) have extensions with a resolution of 27 MHz.

If subtitle is included in the stream, the subtitle decoder 3210 decodes the subtitle, and synchronizes it with the video frame and the audio frame, and supplies the video/audio/ subtitle to a video/audio/subtitle display 3216, via GPU in an embodiment.

The present disclosure is not limited to the above-mentioned system, and either the picture coding device or the picture decoding device in the above-mentioned embodiments can be incorporated into other system, for example, a car system.

The invention claimed is:

1. A method of coding a block of a picture, comprising:
obtaining an indication parameter for a current coding block, wherein the indication parameter indicates whether a multi-hypothesis prediction is applied to the current coding block;
when the indication parameter indicates that the multi-hypothesis prediction is applied to the current coding block, coding the current coding block according to a planar mode, wherein the multi-hypothesis prediction is a combined inter and intra prediction (CIIP), and the indication parameter comprises a CIIP flag.

2. The method of claim 1, wherein the indication parameter is determined based on a merge data syntax.

3. The method of claim 1, further comprises:
obtaining the planar mode for the current coding block according to a most probable mode (MPM) list.

4. The method of claim 3, wherein each of intra prediction modes in the MPM list is associated with a corresponding value of an MPM list index.

5. The method of claim 4, wherein the method further comprises:
parsing a bitstream to obtain the MPM list index, wherein the MPM list index has a value between 0 to N−1, and wherein N is a number of entries of the intra prediction modes in the MPM list.

6. The method of claim 5, wherein the method further comprises:
obtaining the intra prediction mode for the current coding block from the MPM list based on the value of the MPM list index.

7. The method of claim 4, wherein the MPM list comprises at least the planar mode.

8. The method of claim 4, wherein the MPM list comprises the planar mode and at least one of a DC mode, a vertical mode and a horizontal mode.

9. The method of claim 4, wherein the MPM list comprises only the planar mode.

10. The method of claim 4, wherein the MPM list is based on a pre-defined default list.

11. The method of claim 6, wherein the MPM list index is coded into a decimal representation or a binary representation.

12. A coder, comprising:
a memory storage storing instructions; and
one or more processors in communication with the memory storage, and upon execution of the instructions, configured to:
obtain an indication parameter for a current coding block, wherein the indication parameter indicates whether a multi-hypothesis prediction is applied to the current coding block;
when the indication parameter indicates that the multi-hypothesis prediction is applied to the current coding block, coding the current coding block according to a planar mode, wherein the multi-hypothesis prediction is a combined inter and intra prediction (CIIP), and the indication parameter comprises a CIIP flag.

13. The coder of claim 12, wherein the indication parameter is determined based on a merge data syntax.

14. The coder of claim 12, wherein the one or more processors are further configured to:
  obtain the planar mode for the current coding block according to a most probable mode (MPM) list, wherein each of intra prediction modes in the MPM list is associated with a corresponding value of an MPM list index.

15. The coder of claim 14, wherein the one or more processors are further configured to:
  parse a bitstream to obtain the MPM list index, wherein the MPM list index has value between 0 to N−1, and wherein N is a number of entries of the intra prediction modes in the MPM list, and
  obtain the intra prediction mode for the current coding block from the MPM list based on the value of the MPM list index, wherein the MPM list comprises at least the planar mode.

16. A non-transitory computer-readable storage medium storing program instructions for coding a sequence of frames of a video into a bit string, wherein the program instructions, when executed by a processor of a coder, cause the coder to perform operations comprising:
  obtaining an indication parameter for a current coding block, wherein the indication parameter indicates whether a multi-hypothesis prediction is applied to the current coding block;
  when the indication parameter indicates that the multi-hypothesis prediction is applied to the current coding block, coding the current coding block according to a planar mode, wherein the multi-hypothesis prediction is a combined inter and intra prediction (CIIP), and the indication parameter comprises a CIIP flag.

17. The method of claim 5, wherein the MPM list includes a first MPM list and intra prediction is based on one of the entries in the first MPM list when the multi-hypothesis prediction is applied to the current coding block, wherein the MPM list includes a second MPM list and intra prediction is based on one of the entries in the second MPM list when the multi-hypothesis prediction is not applied to the current coding block.

18. The method of claim 1, further comprising:
  obtaining the planar mode for the current coding block according to a most probable mode (MPM) list, wherein each of one or more intra prediction modes in the MPM list is associated with a corresponding value of an MPM list index.

19. The coder of claim 12, wherein the one or more processors are further configured to:
  obtain the planar mode for the current coding block according to a most probable mode (MPM) list, wherein each of one or more intra prediction modes in the MPM list is associated with a corresponding value of an MPM list index.

* * * * *